June 11, 1963 C. H. PROPSTER, JR 3,093,730

AUTOMATIC DATA ACCUMULATOR

Filed Oct. 27, 1959 9 Sheets-Sheet 1

INVENTOR.
C. H. PROPSTER JR.
BY
A M Fernandez
ATTORNEY.

INVENTOR.
C. H. PROPSTER JR.
BY A M Fernandez
ATTORNEY.

INVENTOR.
C. H. PROPSTER JR.
BY A M Fernandez
ATTORNEY.

INVENTOR.
C. H. PROPSTER JR.
BY A M Fernandez
ATTORNEY.

AUTOMATIC DATA ACCUMULATOR

Filed Oct. 27, 1959

INVENTOR.
C. H. PROPSTER JR.
BY A M Fernandez
ATTORNEY.

AUTOMATIC DATA ACCUMULATOR

Filed Oct. 27, 1959 9 Sheets-Sheet 6

INVENTOR.
C. H. PROPSTER JR.
BY A M Fernandez
ATTORNEY.

INVENTOR.
C. H. PROPSTER JR.
BY A M Fernandez
ATTORNEY.

INVENTOR.
C. H. PROPSTER JR.
BY A M Fernandez
ATTORNEY.

June 11, 1963 C. H. PROPSTER, JR 3,093,730

AUTOMATIC DATA ACCUMULATOR

Filed Oct. 27, 1959 9 Sheets-Sheet 9

INVENTOR.
C. H. PROPSTER JR.

BY A M Fernandez

ATTORNEY.

3,093,730
Patented June 11, 1963

3,093,730

AUTOMATIC DATA ACCUMULATOR

Charles H. Propster, Jr., Phoenix, Ariz., assignor to General Electric Company, a corporation of New York
Filed Oct. 27, 1959, Ser. No. 849,002
10 Claims. (Cl. 235—151)

This invention pertains to an information accumulating and recording system, and particularly to a system for automatically accumulating and co-ordinating inspection data from a plurality of sources in a production line.

The development of high-speed inspection methods in manufacturing processes has created a need for a high-speed system for accumulating and co-ordinating inspection data and preparing a permanent record therefrom. The manufacturing process may, for example, be for producing coils of tinplate at a steel mill. In most applications it is necessary to immediately prepare a permanent record so that it may be attached directly to the item inspected as it is removed from the inspection line. In a steel mill, the inspection data may include such information as the total number of feet inspected, the total number of feet free from any defects, the total number of feet having at least one type of defect, the total number of defects of a given type, the over-gauge footage and the under-gauge footage.

Considering a tinplating line in a steel mill as a specific example, the function of a data accumulating system is to produce at high speed an inspection record for each coil directly from the tinning line. In such an installation many of the defect sensors are necessarily fixed at different points along the line so that at a given instant each sensor inspects a finite area of a different foot of tinplate. In order that all of the data pertaining to the same foot may be accumulated at the same time; that is, in order to co-ordinate the inspection data pertaining to a given foot, the data from sensors further from the coil must be delayed until data from other sensors closer to the coil has been generated and is ready to be accumulated. In that manner, all of the inspection data accumulated at any one instant will concern the same foot of tinplate. The data accumulated is then transferred to a permanent record when the coil is sheared from the line.

In such a system, the data must be accumulated at a speed which is extremely high in comparison to the time required to prepare a permanent record. Moreover, if the tinplating line is to run without interruptions, inspection of the next coil should begin immediately after the coil just inspected has been sheared from the line. Accordingly, the data accumulated is transferred to a buffer when the coil is sheared from the line in order to clear the accumulators of the system for the inspection of the next coil. The preparation of a permanent record for the coil just inspected may then proceed at a rate determined by the printing mechanism while inspection of the next coil proceeds at a rate of about 1400 feet per minute.

If the tinplate is not to be sheared while traveling at such a high speed, provision must be made to slow the line for shearing. However, accumulation of the data must continue while the line is being decelerated and accelerated. Therefore, the rate of processing data in the accumulator must be synchronized with the tinplate motion, i.e., with the rate of inspection.

In order to satisfy the growing needs of industry as the trend toward full automation continues, all of these features should be provided in a high-speed data accumulating system for a relatively low cost without sacrificing reliability. Low cost in an apparatus having high speed and reliability is generally difficult to achieve.

Accordingly, it is an object of this invention to provide a novel and economical system for accumulating data from a plurality of sources by utilizing a minimum of active components on a time sharing basis.

It is still a further object to provide a novel system for data accumulation utilizing a rotating magnetic drum, the operating tracks of which are organized into pairs of sectors to form all of the major operating sections.

Still a further object is to provide a system for accumulating data wherein data is processed at a rate determined by the source of data being accumulated.

Another object is to provide a novel system for gathering data pertaining to a given item from a plurality of separate locations along an inspection line.

In one embodiment of the invention, inspection data from a plurality of defect sensors is accumulated and printed on a permanent record through a plurality of synchronized channels, one channel for each type of inspection information to be recorded. Certain channels include a delay element between its associated sensor and accumulator to compensate for the distance that the sensor is displaced from a reference point or shearing station. When all of the inspection data pertaining to a given coil has been accumulated, it is transferred to a buffer and printed out, one digit at a time. The format of the permanent record is so designed that the data printed out may be readily associated with the qualities or defects detected during the inspection. While the permanent record is being prepared, accumulation of inspection data pertaining to the next coil proceeds in a similar manner.

A single rotating magnetic drum provides all of the binary storage required to implement the drum shift registers used as delay elements as well as to implement the accumulators and buffers. Only a small amount of additional binary storage is necessary for the operational control circuits of the shift registers, accumulators and buffers. That additional binary storage is relatively small since only one control circuit is provided for each section. For example, only one control circuit which includes a serial, binary-coded decimal adder is provided for a plurality of accumulators.

This economic use of control circuits is accomplished by a time sharing technique made feasible by organizing the drum in halves or pairs of sectors such that there may be two complete operating cycles for each drum revolution. Data recorded in a given sector is read out in series and immediately rerecorded in corresponding cells of an associated sector on the other side of the drum. One half of a drum cycle later, the data is reread and transferred back to the given sector. Thus, the data is continually transferred from one side of the drum to the other. Each time the data is transferred, it may undergo some operation. Therefore, a system implemented in such a manner may perform two operations during one drum cycle. For instance, a binary-coded addend may be serially added to a binary-coded augend during one half cycle. The sum is immediately recorded in corresponding cells of the sector on the other side of the drum. A second addend may then be added to the new augend during the next half cycle. If not, that sum is transferred back to the other sector. As the sum is transferred back to the other sector from which the augend was read, the aguend is erased because the recording apparatus provided operates in a conventional return-to-zero mode and records the bits of the sum in the same cells from which the aguend was read. Thus, if a second operation of addition is not immediately initiated for the following half cycle, the result is that the sum is identically recorded in both sectors. The sum can therefore be read out during any subsequent half drum cycle. Accordingly, not only does speed result from being able to perform two operations during one drum cycle, but also from being able to read out data on demand with an average delay of only one quarter drum cycle. An additional advantage to be gained from organizing the drum into pairs of sectors is simplicity in the control circuits which in turn results in more economy.

A source of synchronizing pulses is provided on the drum to time each drum operation in the system and another source of pulses controlled by the timplate being inspected is provided to synchronize the rate at which operations occur with the rate at which the inspection data is being produced. In the present embodiment, the second source of synchronizing pulses is a modified tachometer driven by the tinplate to generate one pulse for each linear foot of tinplate motion. This second source of synchronizing pulses in the illustrated embodiment will be referred to hereafter as a TACH pulse source.

Other objects and inventions will become apparent from the following disclosure taken in conjunction with the accompanying drawings in which.

GENERAL DESCRIPTION

Figure 1:
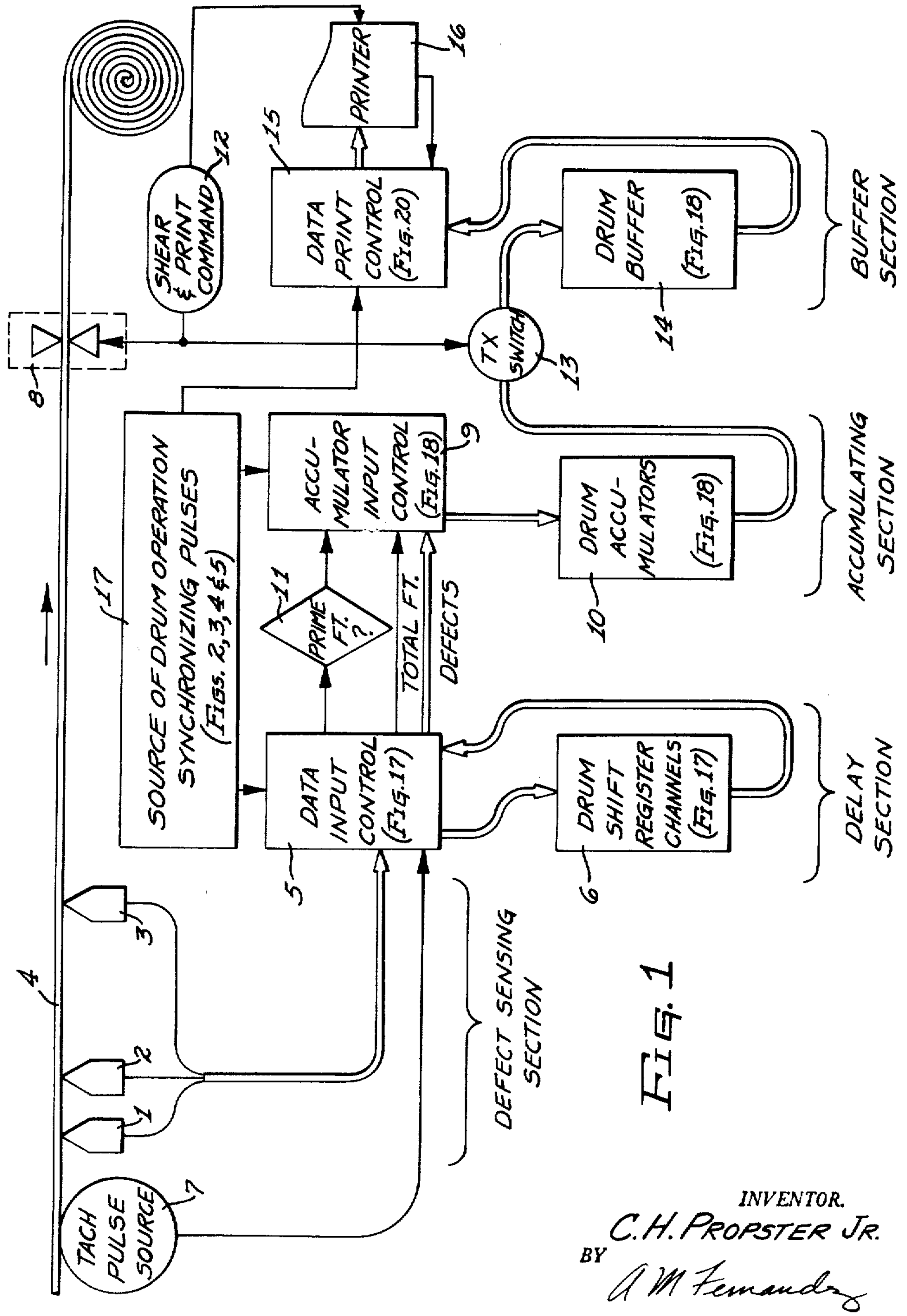
FIG. 1 illustrates schematically the operation of a data accumulating system in accordance with the present invention.

Referring to FIG. 1, three transducers or detectors 1, 2 and 3 are shown for sensing defects in a tinplate 4 as it is inspected and wound into a coil by means not shown.

They are displaced from each other such that each inspects a different foot at a given time. Each defect, such as a pinhole, overgauge or under-gauge, produces a pulse signal in a corresponding detector which is fed to a data input control circuit 5.

To co-ordinate all of the inspection data with respect to a given foot, the inspection data from each detector is so delayed in a delay section that all of the data pertaining to that given foot is fed to an accumulating section at the same time. The delay section consists of the data input control section 5 and a plurality of drum shift register channels 6. Each drum shift register channel receives its corresponding data and transfers it through a plurality of binary storage cells, one cell at a time, in response to TACH pulses from a source 7 until the desired delay has been introduced.

The TACH pulse source 7 may be a tachometer driven by the tinplate and modified to generate a pulse for each linear foot of tinplate that passes over it. Accordingly, the transfer of data through a drum shift register is controlled by TACH pulses and proceeds at the same rate that the tinplate is inspected. For instance, if the detectors 1, 2 and 3 are respectively twenty-five, twenty-three and seventeen feet away from a shearing station 8 and if the data from the detectors is transferred through corresponding shift register channels having twenty-five, twenty-three and seventeen cells, respectively, all of the data transferred out of the shift register channels at any given time must pertain to the same foot of tinplate and that particular foot will at that time have just passed the shearing station 8 regardless of the tinplate speed.

Under normal operation, the tinplate is inspected at a relatively constant rate so that the TACH pulses are generated at a substantially constant rate. However, when the tinplate coil is separated from the line, the tinplate is decelerated, sheared and then accelerated by a control means not shown with the result that the TACH pulse repetition rate is first decreased and then increased to normal again. Since the delay introduced by each drum shift register channel is controlled by TACH pulses, the delay through each channel is in terms of feet of tinplate inspected. Thus, in accordance with the present invention, the delay introduced by the drum shift register channels is electronically synchronized with the inspection line.

The accumulating section to which the co-ordinated data from the delay section is fed consists of an accumulator input control circuit 9 and a plurality of drum accumulators 10, one accumulator for each type of data to be accumulated. The transfer of data from the drum shift register channels 6 to the drum accumulators 10 is accomplished through the data input control circuit 5 and the accumulator input control circuit 9.

In transferring the inspection data from the delay section to the accumulating section, the coordinated data may be processed to develop other useful data which may then be accumulated in addition to the raw data. In the instant embodiment, all of the data pertaining to a given foot is processed by a logic circuit 11 to determine whether any defects were detected. If there were none, a signal is developed indicating that the given foot is prime or first in quality. All of the prime-foot signals are then accumulated in the same manner as other data to provide the total number of prime feet in the coil as part of the information record.

It may not be necessary to co-ordinate all of the data in certain applications. Data which does not need to be coordinated is transferred directly through the data input control circuit 5 and the accumulator input control circuit 9. In the instant embodiment, the total number of feet inspected and the total number of pinholes detected in the coil are not coordinated. The total-feet data which is obtained by accumulating TACH pulses does not need to be co-ordinated since every foot of tinplate is the same for the purpose of obtaining total footage.

The total-pinhole data is obtained by first counting pinhole defect signals in the data input control circuit 5 for each of tinplate inspected and then accumulating the pinhole count for every foot inspected. If an exact total pinhole count is desired for each coil, the pinhole count data should also be co-ordinated in the same manner as other inspection data; but that is not done in the instant embodiment.

When a shear command is received from a source 12 external to the system, a transfer switch 13 is actuated and all of the data in the drum accumulators is transferred to a buffer section which includes a drum buffer 14 and a data print control section 15. The drum buffer 14 stores the accumulated data pertaining to the coil just sheared from the line until the data print control section 15 calls for it to be printed out one digit at a time at a rate determined by a printer 16 which transfers the accumulated data to a permanent record not shown.

The drum shift register channels 6, drum accumulators 10 and drum buffer 14 are all implemented on a band of tracks on a mangetic drum so that only one source of synchronizing pulses 17 is necessary for the proper timing of the operations in each section of the system. The source of synchronizing pulses is also implemented on the band of tracks in a conventional manner.

TIMING

Figures 2, 3, 4, 5, 6:
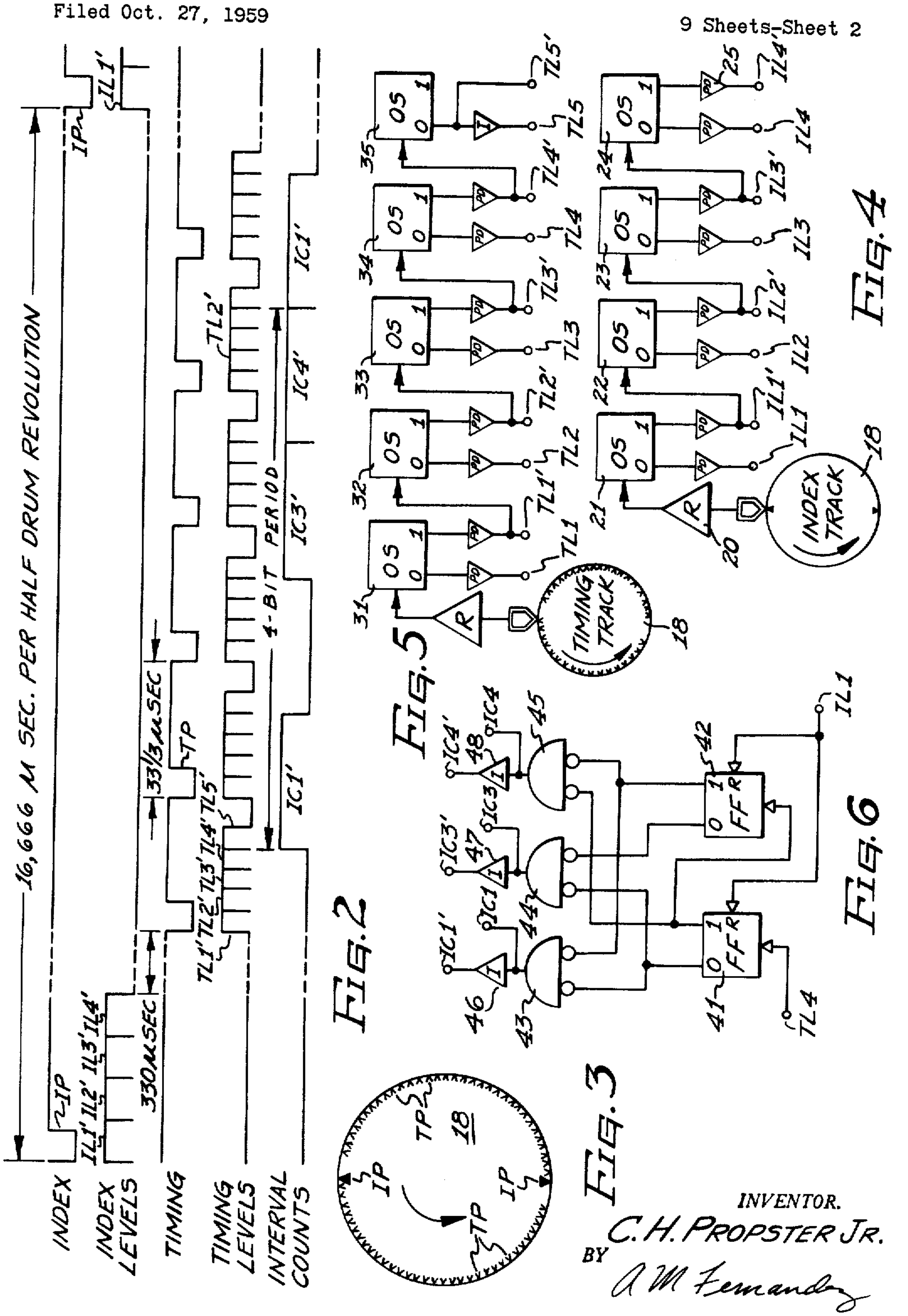
FIG. 2 is a timing diagram of synchronizing pulses.
FIG. 3 illustrates schematically the physical location of recorded timing pulses in each of a pair of sectors with respect to recorded index pulses which define those sectors.
FIGS. 4, 5 and 6 illustrate schematically the manner in which the synchronizing pulses of FIG. 2 may be obtained.

FIG. 2 is a timing diagram of the synchronizing pulses. The first graph is of the negative-going (+6 to 0 volts) index pulses IP, two of which are oppositely written on a single track of the drum 18 (FIGS. 3 and 4) to separate it into a pair of sectors. As mentioned hereinbefore, a novel feature of this invention is the complete organization of the system on a single drum divided into equal parts which are oppositely disposed about the drum. Although in this embodiment the drum 18 (FIG. 3) is divided into only two equal parts, it should be understood that in accordance with this invention, the drum can be organized into any number of equal parts, by simply providing additional index pulses. For instance, the drum could be separated into three equal parts. Data read from one part would immediately be written in the next part. One third of a drum cycle later, the data would be reread. In that way three operations could be performed in one drum cycle.

The third graph is of the negative-going (+6 to 0 volts) timing pulses TP which are written on another track of the drum 18 (FIGS. 3 and 5). They separate each half of the drum between the index pulses into smaller segments, each segment constituting a single binary storage cell in a manner well known in the art. It should be noted from the graphs of FIG. 2, and from FIG. 3, that a blank space is left between each index pulse IP and the first timing pulse TP following it. In the illustrated example that space is about 370 microseconds. The reason for it is to allow more than sufficient time for data to be transferred between sections of the system in synchronism with an index pulse before operations within the sections commence and to provide at least one blank timing pulse period (33⅓ microseconds). Thus, if necessary, that blank space may be reduced to forty microseconds for the time needed to transfer data between sections plus one timing pulse period.

In order to precisely control the transfer of data between sections and to accurately time operations within a given section, several levels of indexing and timing are provided by four index level pulses, each ten microseconds long, and five timing level pulses, each five microseconds long.

The second graph of FIG. 2 is of the index level pulses derived from a circuit shown in FIG. 4 in response to an index pulse from a read amplifier 20. That circuit consists of four one-shot circuits 21 to 24 cascade coupled through power-drivers 25. Each produces a ten microseconds pulse. Since the power-drivers function not only to provide sufficient power to drive a large number of logic circuits in parallel but also to invert the pulses, the IL1′ to IL4′ pulses shown in the second graph of FIG. 2 are actually derived from terminals coupled to the true or 1 output sides of the one-shot circuits. Similarly, the true signals IL1 to IL4 are derived from terminals coupled to the false or 0 output sides of the one-shot circuits.

In a similar manner the timing pulses TP generate the timing level pulses TL1′ to TL5′ as illustrated in the fourth graph of FIG. 2 through five cascaded one-shot circuits 31 to 35 as shown in FIG. 5. As noted hereinbefore, each timing level pulse is five microseconds long.

The reason for designating the positive-going (0 to +6 volts) pulses with a prime, such as the IL1′ and TL1′ pulses, is that a voltage level of +6 volts is used to represent a bit 0 and a voltage level of 0 volts is used to represent a bit 1 in the logic of the system to be described. Accordingly, IL1′ is to be read as "not" IL1 while "not" IL1′, which should be written as $\overline{\text{IL1}'}$, is to be read as IL1. To avoid confusion, the double negative notation will not be used; instead, its corresponding positive notation will be used. However, the inverted or "not" form of a signal obtained from the false side of a flip-flop or one-shot circuit or from the true side through an inverter will very frequently be used.

The pulses in the last graph of FIG. 2 are derived from an interval counter schematically illustrated in FIG. 6. It consists of two cascaded binary circuits 41 and 42 which count the end of each TL4 pulse and which are reset by each IL1 pulse. The function of the interval counter is to separate the binary cells of each half of the drum into digit groups. Each digit group includes four timing periods, each period having a duration from the end of one TL4 pulse to the end of the next TL4 pulse. The number of periods in the group has been arbitrarily selected so that each group may store one four-bit binary-coded decimal digit. A signal corresponding to each of the interval count periods, IC1 to IC4, except the second, IC2, is obtained from a decoder consisting of three logic AND-gates 43, 44 and 45. Inverters 46, 47 and 48 connected to the output terminals of the AND-gates provide the IC1′, IC3′ and IC4′ pulses of FIG. 2.

The sources of these index level, timing level and interval count pulses will not be referred to again. Instead, input terminals which are to be connected to particular ones of the output terminals of the circuits in FIGS. 4, 5 and 6 will be indicated by legends just as the count input terminal TL4 and reset input terminal IL1 have been indicated in FIG. 6.

In addition to the index level and timing level synchronizing pulses, other control signals are obtained from other tracks on the drum. The manner in which those control signals are derived will be described together with the particular sections of the system requiring them.

CIRCUIT ELEMENTS

Before proceeding with a detailed description of an embodiment of the invention, diagrams of circuits which may be used to implement that embodiment will first be described. It should be understood, however, that the circuits shown are simply illustrative; other conventional circuits may be used if preferred.

*Basic Module*

The basic module or building block from which the circuits of the invention may be constructed consists of a common-emitter transistor amplifier that is useful not only as an inverter and as an active element in transistor monostable and bistable multivibrators but also as logic AND and OR gates.

Figure 7:
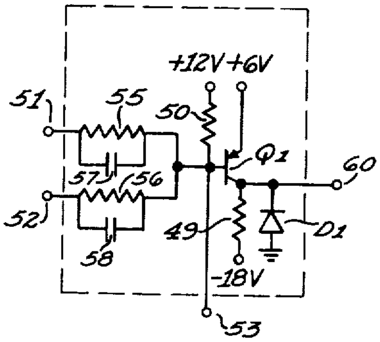
FIG. 7 is a circuit diagram of a modular logic element and FIGS. 7*a* to 7*d* are symbols used to indicate the function of each logic element in the system.

FIG. 7 shows such a basic module which will hereafter be referred to as a logic element. It consists of a PNP junction transistor $Q_1$ of a type suitable for general digital circuit purposes having its emitter connected to a source of +6 volts, its collector connected to a source of −18 volts by a load resistor 49 and its base connected to a source of +12 volts through a bias resistor 50. The collector of the transistor is clamped to ground by a germanium diode $D_1$ so that the collector does not go below ground potential when it is cut off. When the transistor conducts the collector potential increases to almost +6 volts. Three input terminals 51, 52 and 53 are connected to the base; two are connected through coupling resistors 55, 56 having capacitors 57, 58 in parallel with them, and one input 53 is connected directly. Depending on how the inputs are connected and biased, this logic element functions either as an AND-gate or an OR-gate, with signal inversion in each instance, as well as a straight inverter and a module for forming other digital circuits.

Throughout this system the logic elements will be operated with either 0 or +6 volts at the input terminals and with either +6 or 0 volts at an output terminal 60. The 0 volt output level is established by conduction of current through the clamping diode $D_1$ when the transistor is cut off and the +6 volt level is established by conduction of current through the transistor $Q_1$. Since the diode and the transistor have some internal impedance, particularly the transistor, the voltage levels will not be exactly 0 and +6 volts but they will nevertheless be referred to hereafter as 0 and +6 volts for convenience. The +6 volt level is arbitrarily defined as a bit 0 and the 0 volt level as a bit 1 in the logic of the instant embodiment of this invention.

The logic element of FIG. 7 is used as a logic AND-gate by normally maintaining both input terminals 51 and 52 at 0 volts; the third input terminal 53 is not used in a logic AND-gate. The transistor $Q_1$ is then normally conducting at saturation and the output terminal 60 is at +6 volts. Both input terminals 51 and 52 must be driven to +6 volts in order to cut off the transistor and change the potential of the output terminal 60 to 0 volts. Thus, the output of the AND-gate is changed from a bit 0 to a bit 1 only in response to a bit 0 signal at both input terminals. If $A=1$ and $B=1$, the logic AND operation may be written as $A'B'=1$ where A' is "not" A and B' is "not" B. Accordingly, to obtain the logic AND function of any set of signals X and Y, the binary complements X' and Y' are used as the input signals.

Figure 7A:
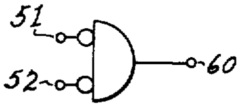

The symbol of a logic element which functions as an AND-gate is shown in FIG. 7*a*. It differs from the most widely used AND-gate symbol only in that a circle is shown in each input channel to signify that the input signals are inherently inverted by the logic AND-gate and that therefore the binary complement of each desired signal must be provided at the input terminals.

As noted hereinbefore, the logic element of FIG. 7 is also used as an OR-gate and as an inverter. For the logic OR function, both input terminals 51 and 52 are normally at +6 volts to hold the transistor cut off; again the third input terminal 53 is not used. The output terminal 60 is then normally at 0 volts. If either input terminal 51 or 52 is driven to 0 volts, the transistor conducts at saturation and the potential of the output terminal is driven to +6 volts. Thus, the output of the OR-gate is changed from a bit 1 to a bit 0 in response to a bit 1 signal at either input terminal. The logic OR operation may be written as $A+B=0$. Accordingly, the OR-gate operates on any set of signals A and B to provide as an output signal a bit 0 if either A or B is a bit 1. It should then be noted that if only one input terminal is used, the logic element functions simply as an inverter.

Figure 7B:
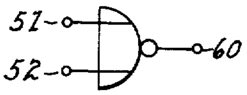
Figure 7C:
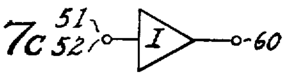

The symbols of logic elements which function as OR-gates and as inverters are shown in FIGS. 7*b* and 7*c*, respectively. The OR-gate symbol differs from the one most commonly used for the OR function only in that a circle is shown in the output channel to signify that the circuit inherently inverts the input signals to provide the complement of the input signals. The symbol for the inverter, on the other hand, is quite conventional.

Logic gates having more than two input terminals may be implemented by either providing additional input channels (to a maximum of four or five) similar to the input channels from the terminals 51 and 52 to the base of the transistor $Q_1$ or by combining several logic elements in a single circuit having a common load resistor 49.

Figure 7D:
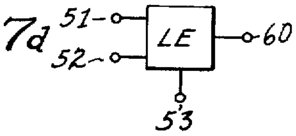

A logic element which functions merely as a module to implement other digital circuits to be described is represented by the symbol shown in FIG. 7*d*.

*Power-Driver*

Figure 8:
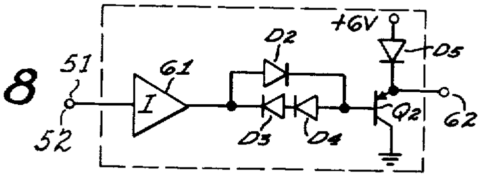
FIG. 8 is a schematic diagram of a power-driver and FIG. 8*a* is a symbol used to represent a power-driver.
Figure 8A:
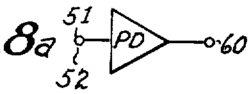

FIG. 8 is a circuit diagram of a power-driver. The symbol used to represent it is shown in FIG. 8*a*. It consists of an inverter 61 coupled to a power amplifier by a germanium diode $D_2$ which passes +6 volt signals from the inverter to the base of a power transistor $Q_2$. The inverter is also coupled to the base of transistor $Q_2$ by two germanium diodes $D_3$ and $D_4$ connected in series to pass a signal that is slightly below 0 volts. As noted hereinbefore, the output potential of the inverter is slightly below 0 volts when the inverter is cut off due to the impedance of the clamping diode $D_1$ shown in FIG. 7. An additional germanium diode may be connected in series with that clamping diode $D_1$ to slightly increase the voltage drop between ground and the inverter output terminal in the power-driver circuit. The advantage of using two clamping diodes in series is that the turn-on response time of the power amplifier transistor $Q_2$ may thereby be improved. The two coupling diodes $D_3$ and $D_4$ act as a resistor when $Q_2$ is cut off because the slight emitter-base current that then flows through them raises the base voltage, thereby insuring that the transistor $Q_2$ is held cut off.

The emitter of the transistor $Q_2$ is clamped to a +6 volts potential by a germanium diode $D_5$ so that when the transistor $Q_2$ is cut off the output terminal 62 of the power-driver is held at a +6 volts. Since the clamping diode $D_5$ provides a substantially constant source of +6 volts when the transistor $Q_2$ is cut off and the transistor $Q_2$ provides a substantially constant source of 0 volts when it conducts at saturation, as many as sixty logic elements may be driven by the output of a single power-driver.

*Bistable Multivibrator*

Figure 9:
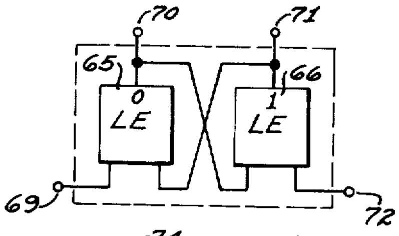
FIG. 9 is a schematic diagram of a bistable multivibrator or flip-flop and FIG. 9*a* is a symbol used to represent a flip-flop.
Figure 9A:
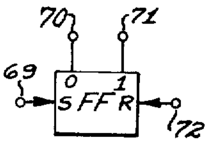

FIG. 9 shows the manner in which two logic elements 65 and 66 are cross-connected to form a bistable multivibrator or flip-flop. The symbol for a flip-flop is shown in FIG. 9*a*. The set 1 input terminal 69 and the bit 0 or false output terminal 70 are connected to the logic element 65 while the bit 1 or true output terminal 71 and the reset input terminal 72 are connected to the logic element 66. In operation, the logic element 66 is normally conducting or On so that the output terminal 71 is at +6 volts. The On logic element 66 holds the logic element 65 cut off or Off and the output terminal 70 is at 0 volts. When a bit 1 signal is applied to the set 1 input terminal 69 the logic element 65 is switched On. Switching that logic element On cuts off the logic element 66 in a manner typical of all Eccles-Jordan type bistable multivibrators. When the logic element 66 is Off, its output terminal 71 is at 0 volts. Thus, a bit 1 signal on the set 1 input terminal 69 produces a bit 1 output signal at the true output terminal 71. The binary complement of a bit stored in a flip-flop is always available at the false output terminal 70. The logic AND and OR gates require the binary complements of the desired input signals in order to obtain the required output signals. Therefore, the flip-flop output signals will generally be taken from the complementary or false output terminals.

*Binary Circuit*

Figure 10:
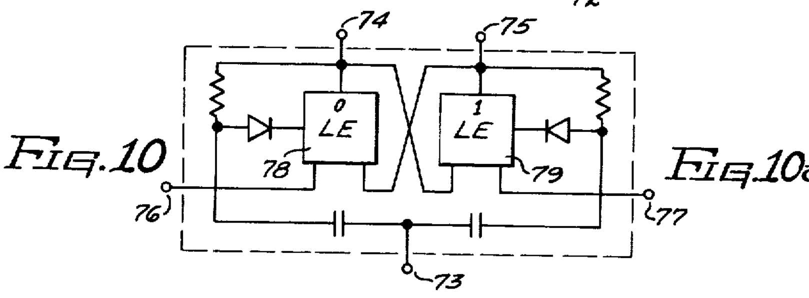
FIG. 10 is a schematic diagram of a binary circuit or steered flip-flop and FIG. 10*a* is a symbol used to represent a binary circuit.
Figure 10A:
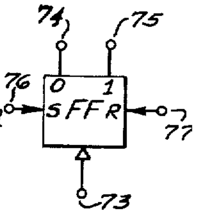

FIG. 10 is a schematic diagram of a binary connected bistable multivibrator and FIG. 10*a* is a symbol which represents a binary connected bistable multivibrator. It has a binary input terminal 73, two output terminals 74 and 75, a set input terminal 76 and a reset input terminal 77. It consists of two logic elements 78 and 79 cross-connected to form a bistable multivibrator and a steering circuit connected to the third or direct-coupled input terminal of each logic element. The detailed description of the operation of such a steering circuit may be found at page 40, section 15, of Handbook of Semiconductor Electronics, McGraw-Hill Book Co. (1956), edited by L. P. Hunter. Briefly, the binary connected bistable multivibrator operates to change its stable state in response to the leading edge of each positive-going signal at its binary input terminal 73. For instance, assume that the flip-flop is storing a bit 1, i.e., that the logic element 78 is conducting and the logic element 79 is cut off. The respective output terminals 74 and 75 are then at +6 and 0 volts. Consequently, the steering diode connected to the logic element 79 is reverse biased by almost +6 volts by the voltage of the output terminal 74 connected to the cathode of that diode through the base of the transistor in the logic element 79. The steering diode connected to the logic element 78, on the other hand, is forward biased by a few tenths of a volt. Accordingly, a positive-going pulse at terminal 73 is differentiated by the coupling capacitors of the steering circuit. The resulting positive-going excursion is transmitted only by the forward biased diode to the logic element 78. In that manner the transistor of that logic element is cut off and the stable state of the flip-flop is switched. The flip-flop of the binary circuit may also be set and reset by 0 volt signals at respective terminals 76 and 77 in a manner similar to the basic flip-flop circuit of FIG. 9.

*Monostable Multivibrator*

Figure 11:
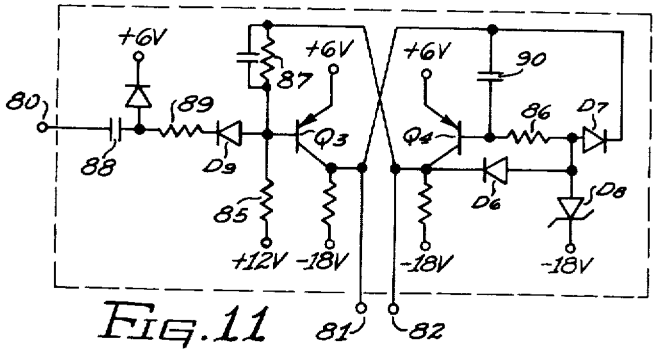
FIG. 11 is a circuit diagram of a one-shot or monostable multivibrator circuit and FIG. 11*a* is a symbol used to represent a one-shot circuit.
Figure 11A:
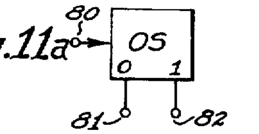

FIG. 11 is a circuit diagram of a monostable multivibrator and FIG. 11*a* is a symbol for monostable multivibrator. It has a single input terminal 80 and a pair of output terminals 81 and 82. It consists of two cross-coupled common-emitter amplifiers $Q_3$ and $Q_4$, each consisting of a PNP junction transistor of a type suitable for general digital circuit purposes having its emitter connected to a source of +6 volts and its collector connected to a source of −18 volts through a load resistor. The base of transistor $Q_3$ is connected to a source of +12 volts through a bias resistor 85 while the base of transistor $Q_4$ is connected to a junction between two clamping diodes $D_6$ and $D_7$ by a bias resistor 86. That junction is maintained at substantially 0 volts by a Zener diode $D_8$.

In the quiescent state, transistor $Q_3$ is held cut off by the biasing network consisting of the bias resistor 85 and a coupling resistor 87 which connects the base of transistor $Q_3$ to the collector of the conducting transistor $Q_4$. In this stable condition, the output terminal 81 is clamped at substantially 0 volts by the conducting diode $D_7$ and the output terminal 82 is clamped at substantially +6 volts by the conducting transistor $Q_4$.

When a negative-going (+6 to 0 volts) pulse is applied to the input terminal 80, it is differentiated by an RC circuit consisting of capacitor 88 and the various resistances in series with it, including a coupling resistor 89 and a diode $D_9$. The differentiated negative pulse applied to the base of transistor $Q_3$ causes it to conduct, raising the output terminal 81 to a +6 volts. That rise in voltage is immediately translated to the base of transistor $Q_4$ through a commutating capacitor 90, cutting off the transistor $Q_4$ and lowering the potential at the output terminal 82 to 0 volts. This switching action is enhanced by the positive feedback provided by the cross-coupling circuits in a manner common to all similar monostable multivibrators.

This quasi-stable state persists until the capacitor 90 charges to the +6 volts potential at terminal 81, at which time the circuit returns to its quiescent state, Thus, the ouput pulse length depends essentially on the RC time constant of the commutating capacitor 90 and the bias resistor 86.

*Binary-Coded Decade Counter*

Figure 12:
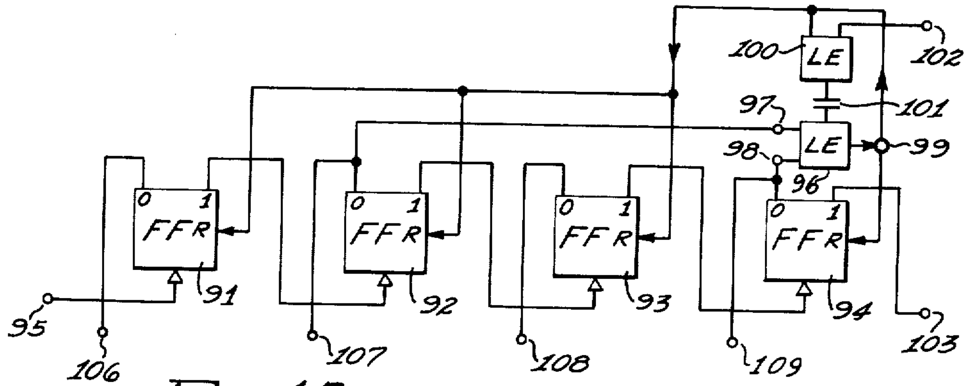
FIG. 12 is a schematic diagram of a binary-coded decade counter and FIG. 12*a* is a symbol used to represent a binary-coded decade counter.
Figure 12A:
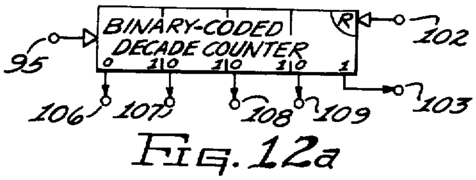

FIG. 12 is a block diagram of a binary-coded decade counter and FIG. 12*a* is a symbol used for a binary-coded decade counter. It consists of four cascaded binary circuits 91 to 94. Positive-going pulses applied to an input terminal 95 are registered in a conventional binary counting manner until, in response to the tenth pulse applied, the respective binary circuits 91, 92, 93 and 94 register a bit 0, 1, 0 and 1. The complementary output signals from the binary circuits 92 and 94, which are then for the first time both at +6 volts, are applied to a logic element 96. In response to the coincidence of a +6 volt signal at both of its input terminals 97 and 98, the logic element products a 0 volt signal at a reset input terminal 99 which is common to all of the binary circuits 91 to 94, and resets them all.

Since the +6 volt signal from the binary circuit 94 is removed from the terminal 98 just as soon as the binary circuit 94 is reset, the 0 volt signal at terminal 99 would normally be removed almost immediately. That would be undesirable because of the possibility that one of the other binary circuits has not had time to reset. Accordingly, positive feedback to the logic element 96 is provided through another logic element 100 and a commutating capacitor 101 to stretch the reset signal. It should be noted that the two logic elements 96 and 100 in effect constitute a monostable multivibrator with a coincidence or AND function being introduced by the logic element 96 and a buffer or OR function being introduced by the logic element 100. The commutating capacitor 101 together with the coupling and bias resistors of the logic element 100 constitute the RC circuit which determines the length of the 0 volt signal applied to the reset terminal 99. The counter may be reset at any time by applying a 0 volt signal to an external reset terminal 102 which is connected to the other input terminal of the logic element 100.

Parallel output signals are derived from complementary or false output terminals 106 to 109 such that each output signal is the complement of the bit registered in the corresponding binary circuit. To provide a counter having a greater capacity, for example one hundred, two binary-coded decade counters may be connected in cascade by directly connecting a carry output terminal 103 of one counter to the input terminal 95 of another counter.

A binary counter having seven stages of cascaded binary circuits will be represented by a similar symbol consisting of an elongated block having appropriate input and output terminals. Such a counter may be implemented simply by cascading seven binary circuits in a manner illustrated by the first three cascaded binary circuits of FIG. 12. A common reset input terminal is provided by merely connecting all of the reset terminals of the binary circuits to a single terminal similar to the terminal 99 in FIG. 12.

*Shift Register*

Figure 13:
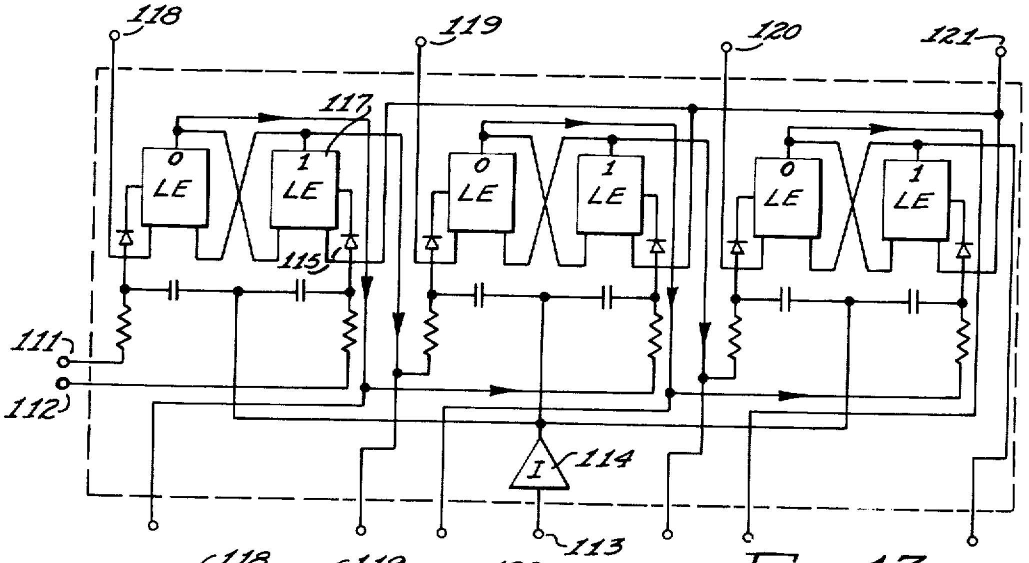
FIG. 13 is a schematic diagram of a shift register and FIG. 13*a* is a symbol used to represent a shift register.

FIG. 13 is a diagram of a shift register having three stages. Each stage consists of a bistable multivibrator as shown in FIG. 9 and a steering circuit which is the same as the one shown in the steered flip-flop or binary circuit of FIG. 10 except that the enabling potentials for the gating diodes are obtained from a preceding stage rather than from the associated logic elements. The first stage obtains the enabling potentials for its steering circuits from an external source connected to serial input terminals 111 and 112. The binary input signal that is to be shifted into the first stage is connected to the input terminal 111 and its complement is connected to the input terminal 112. Assuming that the signal to be shifted in is a bit 1 and that the first stage is storing a bit 0, the potential is 0 volts at the input terminal 111 and +6 volts at the input terminal 112. A negative-going (+6 to 0 volts) shift pulse applied to an input terminal 113 is inverted by an inverter 114, differentiated and gated through a diode 115 in the steering circuit of the first stage to a logic element 117 which is thereby cut off to register a bit 1 in the first stage. Simultaneously, the shift pulse is steered to the bistable multivibrator in the second stage by the output potentials of the first stage to transfer the bit 0 initially stored in the first stage into the second. The logic and operation is the same throughout as in any other shift register except that proper attention must be given to the inverting function of each logic element in connecting them as shown.

In addition to accepting a serial input, the shift register will accept binary signals in parallel through input terminals 118, 119 and 120. However, the signals applied to the parallel input terminals must be synchronized or timed so that they are not applied at the same time that a shift operation is taking place in response to a shift pulse. In a similar manner, all stages may be reset by applying a negative-going (+6 to 0 volts) pulse to a common reset input terminal 121. However, the reset pulses should also be timed so that they are not applied at the same time that a shift operation is taking place.

Figure 13A:
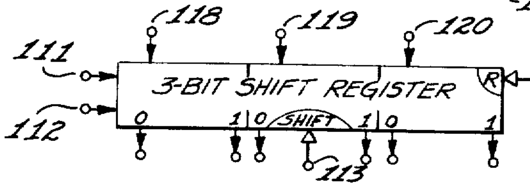

FIG. 13*a* is a symbol which represents a shift register having three stages. Shift registers having four and nine stages will be represented by a similar symbol, the only difference being the addition of one or six stages.

*Grouped Flip-Flops*

Figures 14, 15, 15A, 16, 16A:
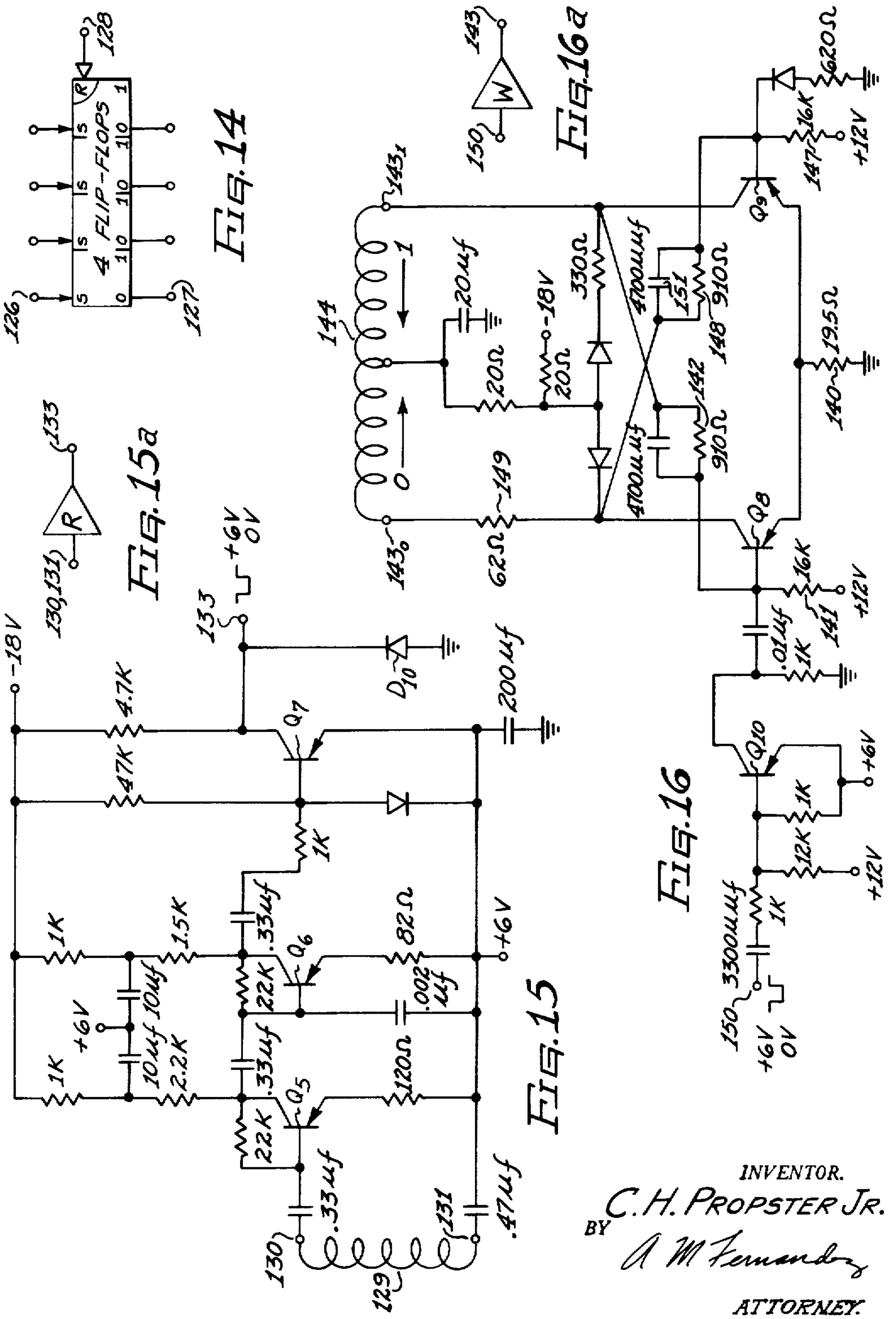
FIG. 14 is a symbol used to represent a set of four invididual flip-flops having a common reset input terminal.
FIG. 15 is a circuit diagram of a magnetic drum read amplifier and FIG. 15*a* is a symbol used to represent a read amplifier.
FIG. 16 is a circuit diagram of a magnetic drum write amplifier and FIG. 16*a* is a symbol used to represent a write amplifier.

FIG. 14 is a symbol for a group of four individual flip-flops, a given one having a set input terminal 126, a complementary or false output terminal 127 and a reset input terminal 128 which is common to all four flip-flops. Except for the fact that all of the reset input terminals are connected together, the flip-flops are independent. They are to be shown as a group for convenience only.

*Read Amplifier*

FIG. 15 is a circuit diagram of a read amplifier and FIG. 15*a* is a symbol for a read amplifier. A coil 129 wound around a magnetic core in a reading head not shown detects a recorded bit 1 in a given cell on the surface of a rotating magnetic drum by having a voltage induced in it as the flux in the cell passes the coil. That voltage signal at input terminals 130 and 131 is capacitively coupled to the first of three cascaded amplifier stages the output of which appears at a terminal 133 as a negative-going (+6 to 0 volts) pulse. All of the transistors $Q_5$, $Q_6$ and $Q_7$ are of a PNP junction type suitable for general digital circuit purposes. The last transistor $Q_7$ is normally conducting so that the output terminal is at approximately +6 volts except when a bit 1 signal is read, at which time it is cut off and the output terminal 133 is clamped to ground by a diode $D_{10}$.

*Write Amplifier*

FIG. 16 is a circuit diagram of a write amplifier and FIG. 16*a* is a symbol for a write amplifier. It consists of a monostable multivibrator comprising two cross-coupled transistor amplifiers $Q_8$ and $Q_9$ having a common emitter resistor 140 connected to ground. The transistor $Q_8$ is biased to be normally conducting by a voltage dividing network which includes resistors 141 and 142 connected to a write-1 output terminal $143_1$ which in turn is connected to a source of negative potential through the write-1 side of a center tapped coil 144 wound around a magnetic core in a writing head not shown. In the quiescent state, transistor $Q_9$ is held cut off by its biasing network which includes resistors 147 and 148 in addition to a resistor 149 which is connected to a write-0 output terminal $143_0$ of the write coil. Thus, the amplifier continually writes a bit 0 except when it is triggered into its quasi-stable state in response to a negative-going (+6 to 0 volts) pulse applied to an input terminal 150. That pulse is first differentiated and then inverted by a common-emitter amplifier consisting of a PNP transistor $Q_{10}$ which, like transistors $Q_8$ and $Q_9$, is suitable for medium power applications in digital circuits.

When the transistor $Q_8$ is cut off in response to a trigger pulse, its collector electrode potential drops from approximately ground potential to about −18 volts. The resulting negative voltage signal is temporarily stored by the write-0 half of the coil 144 and is coupled to the base of transistor $Q_9$ through the coupling resistor 148 and a parallel-connected commutating capacitor 151. Transistor $Q_9$ is then driven into conduction and a bit 1 is written on the drum. After about 12 microseconds the signal stored in the write-0 half of the coil 144 discharges through resistors 147, 148 and 149 and transistor $Q_9$ is again cut off. The transistor $Q_8$ is then rendered conductive and a bit 0 is again continually written until the next write-1 trigger signal is applied to the input terminal 150.

This method of recording binary bits in cells on a rotating magnetic drum is commonly referred to as a return-to-zero mode since a magnetic field of one polarity is recorded on the drum surface to store a bit 0 and a magnetic field of an opposite polarity is recorded on the drum surface of any given cell to store a bit 1. It should be noted that the write amplifier of FIG. 16 is designed to cause a bit 0 to be continually recorded except when a bit 1 is to be recorded so that in effect the write amplifier continually erases stored data and records new data in response to signals applied to its input terminal. Those signals are timed or synchronized by TL1' pulses. Therefore, each cell is marked by a TL1' pulse, since as noted with reference to FIG. 2, a TL1' pulse is generated by a TL pulse.

It should be further noted that although a bit 1 is written at a time TL1, it can be read shortly before or by a time TL1 because in recording a bit 1 such a high surge of current is used that the resulting magnetic field extends to an area on the drum which passes the writing head before time TL1. That is to say, a magnetic field written into a cell by a bit 1 signal at time TL1 will overflow outside of the specific drum area marked by a TL1' pulse so that half a drum revolution later it can be read by time TL1. This is important in order to be able to read a bit 1 from one cell and record it if necessary in another cell on the other side of the drum during the same cell period marked by a TL1' pulse.

DELAY SECTION

Figure 17:
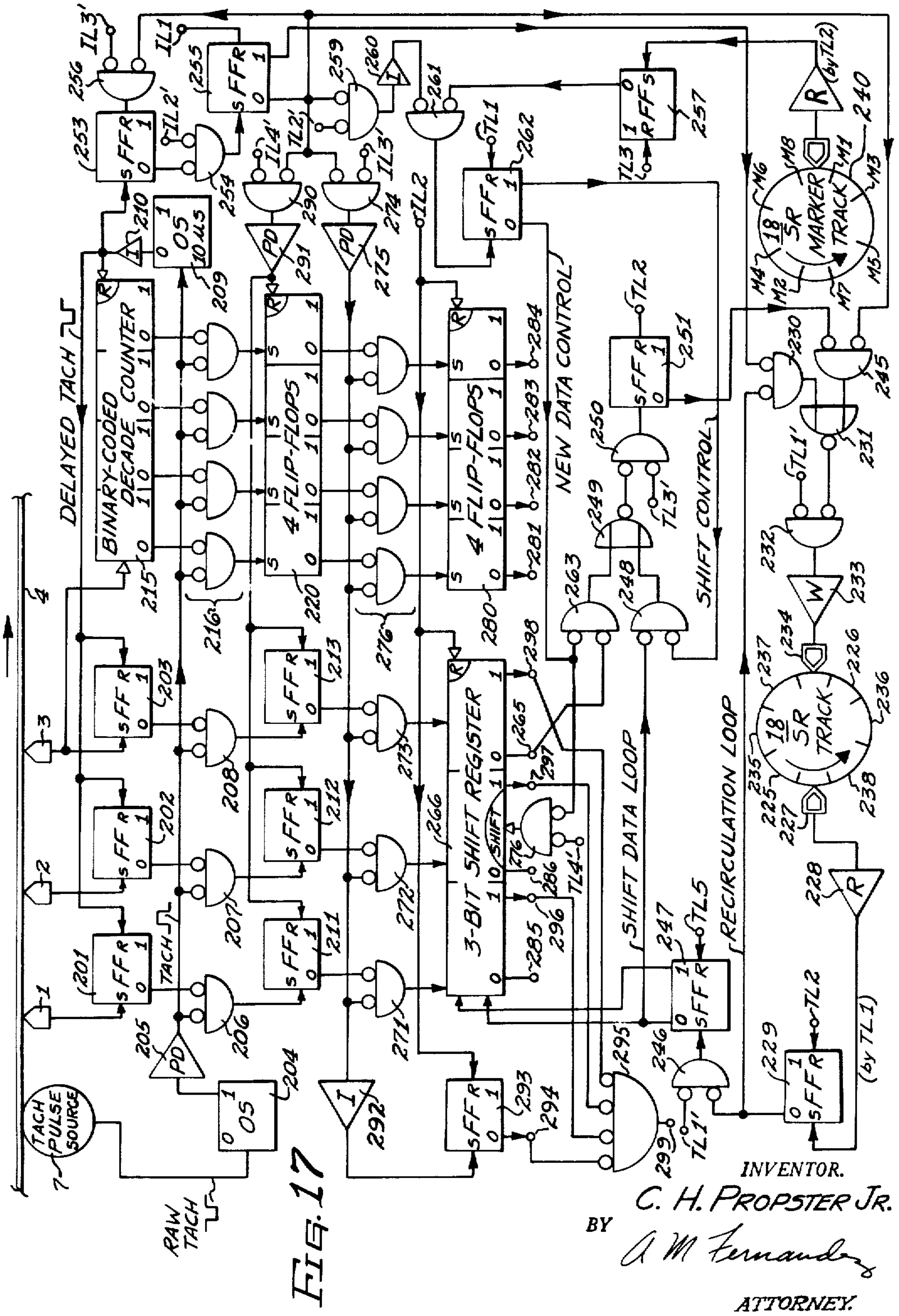
FIG. 17 is a schematic diagram of the delay section of FIG. 1.

As noted hereinbefore with reference to FIG. 1, the delay section consists of two parts, one part including a data input control circuit 5 and the other part including a plurality of drum shift register channels 6. Although only three drum shift registers are illustrated, as many may be povided as space will allow on a track of a magnetic drum. Both parts will be described with reference to FIG. 17.

*Data Input Buffer*

Defects detected in the tinplate 4 by each of the sensors 1, 2 and 3 during a given interval trigger respective flip-flops 201, 202 and 203. At the end of that interval, a TACH pulse from the source 7 triggers a one-shot 204 which generates a ten microsecond negative-going TACH pulse. A power-driver 205 inverts the TACH pulse and gates the defect data stored in the buffer flip-flops 201 to 203 through AND-gates 206 to 208. The negative-going trailing edge of the TACH pulse also triggers a one-shot 209 which generates a ten microsecond positive-going delayed TACH pulse. An inverter 210 converts the delayed TACH pulse into a negative-going pulse which is used to reset the buffer flip-flops 201 to 203. Since the TACH and delayed TACH pulses do not overlap in time, the defect data is gated to another bank of buffer flip-flops 211, 212 and 213 before the first bank of buffer flip-flops 201 to 203 is reset.

Upon being reset, the flip-flops 201 to 203 in the first bank are ready to receive and store defect signals during the next TACH pulse interval. For instance, sensor 3 detects all of the pinholes in a given foot of tinplate, but the first pinhole detected sets the flip-flop 203 which remains set until the next delayed TACH pulse, after which is is ready to receive and store another pinhole defect signal. Any pin-hole detected during that ten microsecond reset period will generate a pinhole defect signal which, by proper design of the defect sensor 3, is ten microseconds long. Accordingly, unless the pinhole defect signal exactly coincides with the delayed TACH pulse, it will properly set the flip-flop 203 during the next interval to indicate that the next foot has at least one pinhole. The probability of such a coincidence occurring is so rare that failing to record such a defect would not seriously impair the accuracy desired. However, if greater accuracy is desired, the sensor 3 may be so designed as to produce an eleven or twelve microsecond defect signal to insure that it is recorded in the next TACH interval.

To accumulate the total number of pinholes detected, each pinhole defect in a given foot is counted by a binary-coded decade counter 215 having its input terminal directly connected to the sensor 3. In this embodiment it is assumed that the total pinhole count for any given foot will not exceed ten. If a larger pinhole count per foot is to be expected, a plurality of binary-coded decade counters may be cascaded to provide a maximum count of one-hundred pinholes per foot or more.

The four-bit binary coded digit at the output terminals of the counter 215 is gated by a TACH pulse through a bank of AND-gates 216 to a group of four individual flip-flops 220 which, like the flip-flops 211 to 213, function as buffers to store the total pinhole count for a given foot while inspection of the next foot proceeds. A delayed TACH pulse resets the counter 215 at the same time that the flip-flops 201 to 203 are reset.

The data is transferred into the buffer flip-flops 211 to 213 and 220 under the control of TACH pulses which are not synchronized with the drum 18. Accordingly, data into and out of the drum shift registers which are implemented on a track of the drum must be synchronized by drum indexing and timing pulses.

*Drum Shift Register*

The first drum shift register memory consists of a recirculating loop having a pair of sectors 225 and 226 that are oppositely disposed about the drum 18 on a track, a read head 227, a read amplifier 228, a buffer flip-flop 229, a control AND-gate 230, an OR-gate 231, a timing AND-gate 232, a write amplifier 233 and a write head 234. Both sectors have the same number of corresponding binary cells. As the drum 18 rotates in the direction indicated, the data in a given cell of one sector, for instance sector 225, is read prior to the occurrence of the TL1 pulse which marks or times that cell. Assuming that a bit 1 was stored in that cell, the buffer flip-flop 229 is set and a +6 volt signal is translated by the normally enabled AND-gate 230 and OR-gate 231 to the timing AND-gate 232 where, in response to a TL1′ pulse, it is gated to the write amplifier 233 to cause a bit 1 to be written in the corresponding cell of the other sector 226. The buffer flip-flop 229 is reset by a TL2 pulse and the entire procedure is repeated for each successive cell in the shift register. If a bit 0 is read from a given cell in sector 225, the buffer flip-flop 229 is not set, the write amplifier 233 is not triggered and a bit 0 is written in a manner described with reference to FIG. 16.

The other two shift registers are identical to the first except that they include respective second and third pairs of sectors (235, 236, and 237, 238) on the same track. The sectors of each pair have a predetermined number of binary cells corresponding to the number of units of delay that is to be introduced by the associated drum shift register. In the illustrative embodiment, the number of cells in the first, second and third channels are seventeen, twenty-three and twenty-five, respectively, since it was assumed in the description of FIG. 1 that the respective sensors 3, 2 and 1 are seventeen, twenty-three and twenty-five feet away from the shearing station 8.

Data stored in the drum shift registers is repeatedly transferred between the corresponding pairs of sectors by reading the data successively from one set of sectors at one station and writing that data during the same cell period in corresponding cells of the other set of sectors at a station on the opposite side of the drum. Transfer from one set of sectors to the other is accomplished twice during one drum revolution or cycle. This organization of the drum in pairs of sectors is advantageous because of each time the data is transferred from one sector to the other, it may be operated upon. Thus, during each drum cycle there may be two operating cycles. In the delay section, an operation is a shift of all data one place with the insertion of one new bit and the extraction of a bit that has been delayed through all of the shift register cells.

The shift register sectors are separated by marker pulses recorded in a marker track 240 of the drum 18. Marker pulses M1 and M2 mark the beginning of the first shift register sectors 225 and 226. Those marker pulses are recorded on the marker track in coincidence with respective TL5 pulses that immediately precede the TL1 pulses which mark the first cells of sectors 225 and 226. A second pair of marker pulses M3 and M4 are similarly recorded to mark the beginning of the second shift register sectors 235 and 236, and the end of the first shift register sectors 225 and 226. A third pair of marker pulses M5 and M6 mark the end of the second shift register sectors 235 and 236 and the beginning of the third shift register sectors 237 and 238. A fourth pair of marker pulses M7 and M8 mark the end of the third shift register sectors.

*Data Shift Control*

In order to shift data in each drum shift register channel during a shift operation, the data in one sector of each channel must be read out at one station and written one cell period later in the opposite sector at the other station. This is accomplished by disabling the control AND-gate 230 to stop the recirculation of data between pairs of sectors and enabling a second control AND-gate 245. A given bit 1 stored in the buffer flip-flop 229 is gated by a TL1′ pulse through an AND-gate 246 to a delay flip-flop 247 in another channel where it is stored until a following TL5 pulse resets it. The flip-flop 247 transmits the bit 1 through a normally open AND-gate 248 and an OR-gate 249 to an AND-gate 250. A TL3′ pulse which precedes the TL5 pulse that resets the delay flip-flop 246 gates the bit 1 to a buffer flip-flop 251. There it is stored until the next TL2 pulse resets it. In the interim, the output signal of the buffer flip-flop 251 is transmitted to the AND-gate 232 through the open shift control AND-gate 245 and the OR-gate 231. There a TL1′ pulse gates the bit 1 signal to the write amplifier 233 which is triggered to write a bit 1 in a manner described hereinbefore with reference to FIG. 16. Since the sequence of events are such that the TL1′ pulse which gates the bit 1 to the write amplifier 233 is the pulse immediately following the TL1′ pulse that gated the bit 1 to the delay flip-flop 229, the delayed bit 1 is rewritten in the cell next to the one corresponding to the cell from which it was read.

From the foregoing it may be understood how all of the data may be shifted one place in the drum shift register during a half drum cycle. However, it should be noted that the shifting channel described is controlled so that data from one shift register is not shifted directly into the next shift register, but into an output channel in response to marker pulses. Before describing the marker pulse control, the manner in which a shift control signal disables the AND-gate 230 and enables the AND-gate 245 will be described.

It should be recalled that data in the drum shift registers is to be transmitted through the AND-gate 230 each half drum cycle until a TACH pulse is generated at the end of a given foot, which means that data is to be transferred from one sector to the other several times between TACH pulses and then advanced or shifted one place during half a drum revolution in response to a TACH pulse.

A delayed TACH pulse sets a buffer flip-flop 253, the output of which is gated by an IL2′ pulse through an AND-gate 254 to set a shift control flip-flop 255, thereby enabling the control AND-gate 245 and disabling the control AND-gate 230. This stable condition persists until the next IL1 pulse which, of course, occurs virtually half a drum revolution later. Immediately after the flip-flop 255 is set, the shift control output of flip-flop 255 is gated by an IL3′ pulse through an AND-gate 256 to reset the delayed TACH buffer flip-flop 253. Before the flip-flop 255 is reset by an IL1 pulse, one shift operation is completed through the AND-gate 245. After it is reset, the recirculation of data between corresponding sectors is resumed via the AND-gate 230. However, the transmission of data through the AND-gate 245 is not without interruptions.

In response to each marker pulse read from the shift register marker 240, a buffer flip-flop 257 is set from about the time of a TL5 pulse until a following TL3 pulse, at which time the flip-flop 257 is reset. If the shift control flip-flop 255 had been set at the beginning of the half drum cycle, a TL2′ pulse is transmitted through an AND-gate 259, an inverter 260 and an AND-gate 261 to set a new-data control flip-flop 262, thereby enabling a new-data control AND-gate 263 and disabling the normally enabled shift control AND-gate 248. A new bit is then transmitted through AND-gate 263 and OR-gate 249. A TL3′ pulse gates the new bit through the AND-gate 250 to set the buffer flip-flop 251 before the new-data control flip-flop 262 is reset by a TL1 pulse. In that manner, a marker pulse which marks the beginning of a shift register sector, for instance the pulse M1 which marks the beginning of sector 225, gates a new bit into the first cell of the corresponding shift register sector, in this instance sector 226.

A marker pulse which marks the end of one shift register and the beginning of the next, such as the marker pulse M3, prevents a bit read out of the last cell of the corresponding shift register sector, in this instance sector 225, from being shifted into the next shift register sector, the sector 236. Since the marker pulse M3 marks the beginning of a shift register channel, it also gates a new bit into the next shift register channel. A marker pulse which only marks the end of a shift register sector, such as the marker pulse M7, will also switch the control AND-gates 248 and 263. However, a bit transmitted to the flip-flop 251 at that time would be gated to the write amplifier 233 by the next TL1′ which marks a spill-over cell outside the last shift register sector. That bit is thus discarded because no other TL1 pulse occurs until after the next index pulse which recycles the circuit.

The new input data is derived from a serial output terminal 265 of a three-bit shift register 266. After a given new bit is transmitted into a shift register sector in response to a TL3′ pulse applied to the AND-gate 250, the new data control signal is gated by a TL4′ pulse through an AND-gate 276 to advance the data in the three-bit shift register one position. As the new data is thus advanced in the three-bit shift register, the bit read from the last cell of the preceding shift register channel is shifted from the delay flip-flop 247 into the first stage of the three-bit shift register. For example, during one half drum cycle, three bits of new data in the shift register 266 are transmitted to the drum shift register channels, the first bit into the first cell of the first shift register channel in response to the M1 marker pulse, the second bit into the first cell of the second shift register channel in response to the M3 marker pulse, and the third bit into the first cell of the third shift register channel in response to the M5 marker pulse. The M7 marker pulse then shifts the third bit of new data out of the last stage of the shift register 266. As each new bit of data is shifted out of the three-bit shift register, the bit read from the last cell of each shift register channel is gated to the delay flip-flop 247 by a TL1′ pulse and shifted into the three-bit shift register. Thus, when the last new bit is shifted out of the three-bit shift register in response to the M7 pulse in the foregoing example, the delayed bit from the last cell in the third shift register channel is shifted into the first stage of the three-bit shift register.

*Unloading the Three-Bit Shift Register*

At the end of a drum shift operation cycle, data in the three-bit shift register 266 is transferred in parallel to the accumulating section by an IL1′ pulse and the three-bit shift register is then reset by an IL2 pulse. It remains reset until the next drum shift operation is initiated by a TACH pulse.

*Loading the Three-Bit Shift Register*

Data in the buffer flip-flops 211, 212 and 213 is stored in a static condition until an IL3′ pulse gates it into the three-bit shift register 266 in parallel through AND-gates 271, 272 and 273. However, an IL3′ pulse does not gate the data into the shift register until an AND-gate 274 is enabled by a shift signal from the flip-flop 255 which is set by the coincidence of a delayed TACH pulse and an IL2′ pulse. A power-driver 275 is provided at the output of the AND-gate 274 to provide the polarity and power necessary to operate the AND-gates 271, 272 and 273 in addition to a bank of AND-gates 276 which gate a four-bit digit in parallel into a second bank of four buffer flip-flops 280 from a first bank of four buffer flip-flops 220. There the four-bit digit is stored and presented in parallel at terminals 281 to 284 during the next half drum cycle while a drum shift operation is executed after which the flip-flops are unloaded and cleared in the same manner as the shift register 266. The reason for the static storage of a four-bit digit in the flip-flops 280 during a drum shift operation is that the total pinhole count data is not to be delayed.

After data is loaded into the shift register 266 and a four-bit digit is gated into the flip-flops 280 by an IL3′ pulse, the buffer flip-flops 211, 212, 213 and 220 are reset by an IL4′ pulse which is transmitted through an enabled AND-gate 290 and a power-driver 291.

In summary, the sequence of operations for the delay section is as follows:

(1) The first defect detected by each of the sensors 1, 2 and 3 sets the respective one of the flip-flops 201, 202 and 203. The first and subsequent defects detected by the sensor 3 are accumulated by the decade counter 215.

(2) A TACH pulse transfers the inspection data to buffer flip-flops 211 to 213 and 220.

(3) A delayed TACH pulse resets the flip-flops 201 to 203 and the counter 215 and sets the flip-flop 253.

(4) An IL2′ pulse sets the shift control flip-flop 255 which remains set for half a drum cycle.

(5) An IL3′ pulse resets the flip-flop 253 and gates the inspection data into the shift register 266 and buffer flip-flops 280.

(6) An IL4′ pulse resets the buffer flip-flop 211 to 213 and 220, thereby concluding the preparations necessary for one shifting cycle of the drum shift registers.

(7) The marker pulse M1 or M2, depending on which half of the drum is being read at the time, sets flip-flop 257. Assume it is the M1 marker pulse that is read for the following sequence of operations.

(8) A TL2′ pulse sets the new-data control flip-flop 262 via AND-gate 259, inverter 260 and AND-gate 261.

(9) A TL3 pulse resets the flip-flop 257 and a TL3′ pulse gates new data from terminal 265 of the three-bit shift register into the buffer flip-flops 251 via AND-gate 263, OR-gate 249 and AND-gate 250.

(10) A TL4′ pulse shifts the data one position to the right in the three-bit register 266 and inserts new data from the left, thereby entering a bit of extraneous data into the first stage from flip-flop 247.

(11) By the next TL1 pulse, the first cell of the first shift register sector 225 is read and buffer flip-flop 229 is set.

(12) A TL1 pulse resets flip-flop 262 and a TL1′ pulse writes the new bit in the first cell of sector 226. The TL1′ pulse simultaneously gates the old bit 1 stored in the buffer flip-flop 229 to the delay flip-flop 247.

(13) A TL2 pulse resets flip-flops 229 and 251.

(14) A TL3′ pulse gates the old bit stored in the delay flip-flop 247 to flip-flop 251 via AND-gate 248, OR-gate 249 and AND-gate 250.

(15) A TL4′ pulse shifts the first old bit stored in the delay flip-flop 247 into the shift register 266.

(16) The next TL1′ pulse writes the first old bit in the second cell of sector 226 and gates the second old bit read from sector 225 to the delay flip-flop 247.

(17) Steps 13, 14, 15 and 16 are repeated until all the data in the first drum shift register has been advanced one cell and the bit read from the last cell is stored in the delay flip-flop 247.

(18) When the marker pulse M3 is read, steps 7 to 16 are repeated for the second drum shift register.

(19) When the marker pulse M5 is read, steps 7 to 16 are repeated for the third drum shift register.

(20) Finally, the marker pulse M7 is read and the flip-flop 257 is set.

(21) A TL2′ pulse sets the new-data control flip-flop 262 via AND-gate 259, inverter 260 and AND-gate 261.

(22) A TL3′ pulse gates a bit into flip-flop 251 from the shift register terminal 265 via AND-gate 263, OR-gate 249 and AND-gate 250. It should be recognized that this bit of data is the extraneous bit shifted into the three-bit shift register at the beginning of the shift operation cycle in response to a TL4′ and M1 pulse as described in step 10.

(23) A TL1 pulse resets the flip-flop 262 and a TL1′ pulse writes the extraneous bit stored in flip-flop 251 in the next cell of the drum which is an overflow cell outside of the third shift register sector. No further drum operations are then possible, except the resetting of flip-flop 229, 251, 257 and 247, in that order, since no other timing pulses are written on the drum.

(24) The next IL1 pulse resets the flip-flop 255, thereby rendering the delay section immediately capable of performing another complete sequence of operations as just described if a TACH pulse is received immediately. At the same time, an IL1′ pulse gates the data in the shift register as well as the buffer flip-flop 280 to the accumulating section in FIG. 18.

(25) An IL2 pulse resets the shift register 266 and the flip-flop 280.

*Total Feet Inspected Data*

The total number of feet of tinplate inspected for a given coil is determined by indirectly accumulating TACH pulses. That is accomplished by gating the shift control signal from the flip-flop 255 through the AND-gate 274. The gated signal is then transmitted through the power-driver 275 and an inverter 292 to a buffer flip-flop 293. Since a TACH pulse indirectly sets the shift control flip-flop 255 in a manner described hereinbefore, the signal gated to the flip-flop 293 indicates that a TACH pulse has been generated and that, therefore, a foot of tinplate has been inspected. An IL1′ pulse gates the output signal of the flip-flop 293 from an output terminal 294 to the accumulating section of FIG. 18. An IL2 pulse then resets the flip-flop 293.

*Prime Feet Data*

A logic AND-gate 295 is provided to determine whether a given foot of tinplate inspected, as defined by a TACH pulse, is prime or free of any defects. One of the input terminals of that AND-gate is connected to the terminal 294. The other input terminals of that AND-gate are connected to the true sides of the binary circuits in the three-bit shift register 266 at terminals 296, 297 and 298. The output terminal 299 of the AND-gate is connected to the accumulator input control circuit of FIG. 18. In order to obtain a prime-foot signal at the output terminal 299 of the AND-gate 295, the flip-flop 294 must be set to indicate that a foot of tinplate has been inspected and each stage of the three-bit shift register must be reset to indicate that no defects were detected when that given foot was inspected. Because all of the data in the three-bit shift register does not pertain to the same foot of tinplate inspected until a shift operation has been completed, the output signal at the terminal 299 is not gated into the accumulator input control section until the next IL1′ pulse as will be more fully described with reference to FIG. 18.

ACCUMULATING SECTION

*General*

Figure 18:
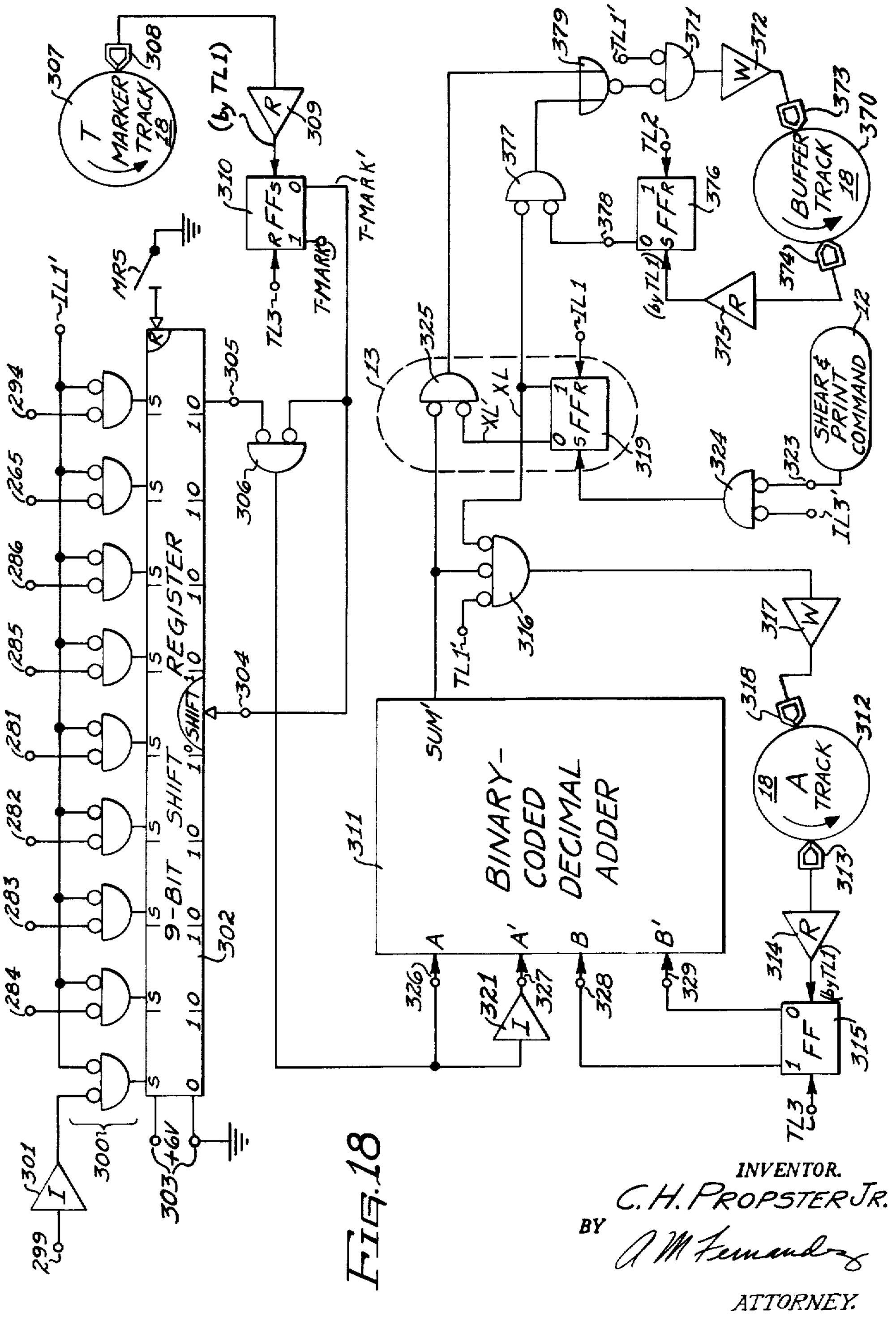
FIG. 18 is a schematic diagram of the accumulating and buffer sections of FIG. 1.

As noted hereinbefore, an IL1′ pulse gates the inspection data from the delay section (FIG. 17) to the accumulating section (FIG. 18). Data transferred to the accumulating section is added during the following half drum cycle to data previously accumulated. For instance, a bit 1 denoting that a given type of defect was detected is added to a previous total in a given accumulator provided for that given type of defect data. In the instant embodiment, there are six data accumulators, one for the total pinhole count, one each for the total number of feet having one of three different types of defects, one for the total number of feet inspected and one for the total number of prime feet. The accumulating process is repeated during each half cycle. However, each IL1′ pulse gates only zero bits into the accumulator section except those IL1′ pulses which follow a shift operation in the delay section (FIG. 17), for only then is there any data being stored in the shift register 266, buffer flip-flops 280 and buffer flip-flop 293 of that section.

*Accumulator Input Control*

The data from the delay section is gated to the accumulating section through a bank of AND-gates 300. The output terminals of the delay section (FIG. 17) and the input terminals of the AND-gates 300 (FIG. 18) which are connected to those output terminals, are designated by the same reference numerals. They are the total pinhole count terminals 281 to 284; the delayed inspection data terminals 285, 286 and 265; the terminal 294 for the bit 1 which represents that a foot of tinplate has been inspected; and a terminal 299 for the bit which denotes whether the foot to which the inspection data at terminals 285, 286 and 265 pertains is prime. The terminal 299 is coupled to one of the AND-gates through an inverter 301 to obtain the complement of the prime-foot data since, as noted hereinbefore with reference to FIG. 7*a*, the logic AND-gate requires the complement or inverted form of the signals to be combined.

Each of the output terminals of the AND-gates 300 is connected to a set input terminal of a different stage of a nine-bit shift register 302. A pair of serial-input terminals 303 are connected to a constant bit-0 source illustrated by a +6 volt signal connected to one terminal and a 0 volt signal or ground connected to the other terminal. Each pulse applied to the shift input terminal 304 of the shift register advances the stored data one place to the right. In that manner, each bit of the data transferred in parallel into the shift register 302 is read out serially through an output terminal 305. As each of the nine bits of data is serially read out, a bit 0 from the serial input terminals 300 is shifted into the shift register. Consequently, as data is gated into the accumulators through an AND-gate 306 connected to the serial output terminal 305, the shift register stages are reset. A manually operated reset switch MRS is connected to the reset input terminal of the shift register 302. It may be momentarily closed to initially reset the shift register when the accumulating system is turned on.

The data serially read out through the output terminal 305 is gated through the AND-gate 306 by T-MARK' pulses which are generated in response to T-marker pulses recorded on a track 307 of the drum 18. Those pulses are read by a head 308 and translated by an amplifier 309 to set a flip-flop 310 prior to the time of a TL1 pulse. In that way the flip-flop 310 is set by the time of the leading edge of a TL1 pulse and reset by the leading edge of a TL3 pulse applied to its reset input terminal. The T-MARK' signals from the false output terminal of the flip-flop gates the signals from the output terminal 305 to a binary-coded decimal adder 311 of the drum accumulators. The T-MARK' pulses are also applied to the shift input terminal 304 but since the T-MARK' pulses are positive-going (0 to +6 volts), the data in the shift register is not advanced one place or stage until the negative-going (+6 to 0 volts) trailing edge because, as noted with reference to FIG. 13, the shift register requires a negative-going shift signal. Accordingly, the serial output signal of the shift register is gated to the binary adder 311 from prior to the time of the leading edge of a TL1 pulse to the time of the leading edge of the next TL3 pulse. Then the AND-gate 306 is disabled and the data is shifted one place to the right.

There are nine T-marker pulses recorded on the track 307, one for each of the nine bits in the shift register. Accordingly, the T-MARK' pulses T1 to T9 time or mark particular binary cells in an accumulator track 312. Those cells are the first cell of each accumulator and the second, third and fourth cells of the fifth accumulator. The following chart graphically illustrates the timing of the T-MARK' pulses T1 to T9.

FIRST ACCUMULATOR

/1 0 0 0 /0 0 0 0 /0 0 0 0 /0 0 0 0
T1

SECOND ACCUMULATOR

/0 1 0 0 /0 0 0 0 /0 0 0 0 /0 0 0 0
T2

THIRD ACCUMULATOR

/1 1 0 0 /0 0 0 0 /0 0 0 0 /0 0 0 0
T3

FOURTH ACCUMULATOR

/0 0 1 0 /0 0 0 0 /0 0 0 0 /0 0 0 0
T4

FIFTH ACCUMULATOR

/0 0 0 1 /1 0 0 1 /1 0 1 0 /0 0 0 0
T5 T6 T7 T8

SIXTH ACCUMULATOR

/0 0 0 0 /0 0 0 0 /0 1 1 0 /0 0 0 0
T9

In the foregoing chart, the cells of the six accumulators are graphically illustrated in separate lines, but on the drum they would be in one continuous line or track. Each cell is indicated by either a bit 0 or a bit 1. The cells are separated into groups of four by bars which, of course, are not present on the drum. In the present embodiment, the cells are actually grouped by the interval counter described with reference to FIG. 6. The interval-count signals derived therefrom are utilized in the binary adder 311 and the data print control circuit (FIG. 20) to separate the bits sequentially read from cells on the drum into four-bit binary-coded decimal digits. For instance, the total pinhole count in the fifth accumulator is illustrated in the chart as 0598. The least significant digit 8 is stored in the first four cells on the left of the accumulator. The digit 0 in the highest order of that number is stored in the last four cells on the right. Of each group of four cells, the first cell on the left stores the least significant bit. The data is stored in the accumulator in that order so that the least significant bit of the least significant digit of each accumulator is always read first. That is necessary because the binary adder must operate on the bits of each digit and on the successive digits in the order of their increasing significance.

The function of each of the T-MARK' pulses T1 to T9 illustrated in the foregoing chart is to gate one bit from the shift register 302 to its appropriate accumulator. The first, second, third, fourth and sixth accumulators have only one T-MARK' pulse each since they accumulate only unitary bits. The fifth accumulator, however, has four T-MARK' pulses T5 to T8 since it accumulates the total number of pinholes by adding four-bit binary-coded digits which represent the pinholes detected in successive feet of tinplate.

When the accumulated data is printed, in a manner to be more fully described with reference to FIG. 20, the last digit of the sixth accumulator is read out, decoded and printed first because it is the most significant digit of that accumulator and it is desirable to print one digit at a time starting with the most significant digit of the last accumulator. Before that digit is read out, however, an XL' signal from the flip-flop 319 in the transfer switch 13 (FIG. 18) sets a zero-suppress circuit in FIG. 20 which prevents that digit from being printed if it is a zero, and prevents all subsequent digits from being printed until the first non-zero digit is read out and detected. The T9, T5, T4, T3 and T2 pulses are employed for the same purpose when the data from the fifth, fourth, third, second and first accumulators are read out and printed in that order. The T1 pulse is used in the print control circuit of FIG. 20 only to determine when all of the data has been printed.

*Drum Accumulators*

The memory portion of each of the accumulators consists of a pair of sectors oppositely disposed on the track 312. Each sector consists of sixteen binary cells which are separated into groups of four by interval count pulses as described hereinbefore.

Referring again to the foregoing chart, the sectors in one half of the track are arranged in sequence. The last four cells of the sixth accumulator comprise the last group of four cells on that half of the track before an IL1 pulse resets the interval counter (FIG. 6). The second half of the accumulator track 312 is identical to the first half.

Data stored in a given half of the track is read sequentially by a head 313 and a read amplifier 314. A buffer flip-flop 315 stores each bit from the amplifier 314 until it is reset by a TL3 pulse. In the interim, a bit stored in the buffer flip-flop is translated by the binary-coded decimal adder to an input terminal of an AND-gate 316 where it is gated by a TL1' pulse to a write amplifier 317 which records the gated bit on the track 312 through a recording head 318. In that manner, the data is transferred from one side of the track to the other twice during each drum revolution cycle until a flip-flop 319 is set. The true output terminal of the flip-flop 319 is connected to an input terminal of the AND-gate 316. Therefore, when it is set, the AND-gate is inhibited from gating the data read from one-half of the track to the other half of the track.

The flip-flop 319 is set by a shear signal at a terminal 323 transmitted from the shear and print command source 12 through an AND-gate 324 when a given coil being inspected is to be sheared from the line. An IL3' pulse gates the shear signal through the AND-gate 324 to set the flip-flop 319 at the beginning of a half drum cycle. All of the data read from the track 312 on one side of the drum is then transmitted to the buffer section through an AND-gate 325 which is enabled by a +6 volt signal from the false side of the flip-flop 319. The flip-flop is reset at the beginning of the next half cycle so that the accumulation of data from the next coil may begin.

While the data read from a given half of the track 312 is being transmitted through the AND-gate 325 in the transfer switch 13, the data in the other half of the drum is being erased since the write amplifier 317 continually records a bit 0 except when it is triggered by a bit 1, as noted hereinbefore with reference to FIG. 16.

Data translated through the binary-coded decimal adder 311 is delayed therein four timing periods. Therefore, if the read head 313 were to be placed exactly opposite the write head 318 as it was in the delay section, the data would be shifted through four binary cells during each half drum revolution. Accordingly, the write head 318 is slipped ahead in the direction of rotation four bit positions or binary cells so that it records a bit of data on the track 312 in a cell opposite to the cell read by the read head 313. In that manner, data read by the head 313 may be translated to the write head 318 through a four-bit shift register in the binary adder 311 and recorded without it precessing around the drum with respect to the index pulses.

*Binary-Coded Decimal Adder*

Each bit gated through the AND-gate 306 is fed directly to an input terminal 326 of the binary-coded decimal adder 311. Each gated bit is also transmitted through an inverter 321 and fed to an input terminal 327. Hereafter, data fed to the terminal 326 will be referred to as the addend A and the data fed to the terminal 327 will be referred to as the complement A' of the addend.

Each four-bit binary-coded decimal digit read from the accumulator track 312 is fed to an input terminal 328 of the binary-coded decimal adder 311. The complement of each bit fed to that terminal is fed to another input terminal 329. Hereafter, data fed to the terminal 328 from a given accumulator sector of the track 312 will be referred to as the augend B and the data fed to the terminal 329 will be referred to as the complement B' of the augend.

The output signal of the binary-coded decimal adder will be referred to as the sum, but it should be noted that each bit of the sum fed to the AND-gates 316 and 325 is the complement of the sum as denoted by the legend SUM'.

The manner in which the addend is added to the augend by the binary-coded decimal adder 311 to provide a binary-coded decimal sum will now be described with reference to FIG. 19. In general, the addend is in binary-coded form but since it consists of either a unitary bit or a four-bit binary-coded digit from 0 to 9, the addend is always a binary-coded decimal digit from 0 to 9. The augend is also in binary-coded decimal form because each digit of the augend translated through the adder is a four-bit binary coded digit and the sum is converted to a binary-coded decimal form by the adder. For instance, if two four-bit binary-coded decimal digits are added in the conventional binary manner, the sum may exceed nine, as when a seven is added to an eight to produce a four-bit binary-coded sum of fifteen which has no meaning in a binary-coded decimal system. When that occurs, the sum is converted to the decimal system by first inserting a carry in the augend's next higher order and then subtracting a binary ten from the forbidden sum, thereby obtaining the decimal digit of the binary sum less ten. A ten can be subtracted from the forbidden sum of fifteen by adding to it a binary six and ignoring the carry.

An example will clarify the foregoing converting process. Assume that the augend is 0598 and that the addend is seven. The conventional binary addition is as follows:

| | | | | | |
|---|---|---|---|---|---|
| Carry | (0) | 0000 | 0000 | 0000 | 000 |
| Augend | | 0000 | 0101 | 1001 | 1000 |
| Addend | | | | | 0111 |
| P-Sum | | 0000 | 0101 | 1001 | 1111 |

The preliminary sum (P-Sum) of the addend and the least significant digit of the augend is a binary-coded fifteen, which is a forbidden word. To convert the preliminary sum when the forbidden word is detected, a carry must be added to the binary-coded nine in the next higher decimal order and a six added to the binary-coded fifteen as follows:

| | | | | | |
|---|---|---|---|---|---|
| Carry | (0) | 0000 | 0000 | 0001 | 110 |
| P-Sum | | 0000 | 0101 | 1001 | 1111 |
| Six | | | | | 0110 |
| C-Sum | | 0000 | 0101 | 1010 | 0101 |

In the corrected sum (C-Sum), the least significant digit has been corrected to a five and a carry added to the next most significant binary-coded decimal digit, thereby increasing it from nine to ten which, in a binary-coded decimal system, is also forbidden and again has no meaning. That the second digit has also exceeded nine must be detected and the process of converting the second four-bit binary-coded digit in the next order must be accomplished as follows:

| | | | | | |
|---|---|---|---|---|---|
| Carry | (0) | 0000 | 0011 | 110 | |
| C-Sum | | 0000 | 0101 | 1010 | 0101 |
| Six | | | | 0110 | |
| F-Sum | | 0000 | 0110 | 0000 | 0101 |

In converting the second digit, the least significant digit 5 is not involved since it has already been stored but it has been written again to complete the final sum (F-Sum) of 605.

It should be noted that in the foregoing example the least significant bit of each binary-coded digit has been placed on the right and that a serial adder has been employed so that the binary-coded digits may be added and converted to the binary-coded decimal system in sequence.

Figure 19:
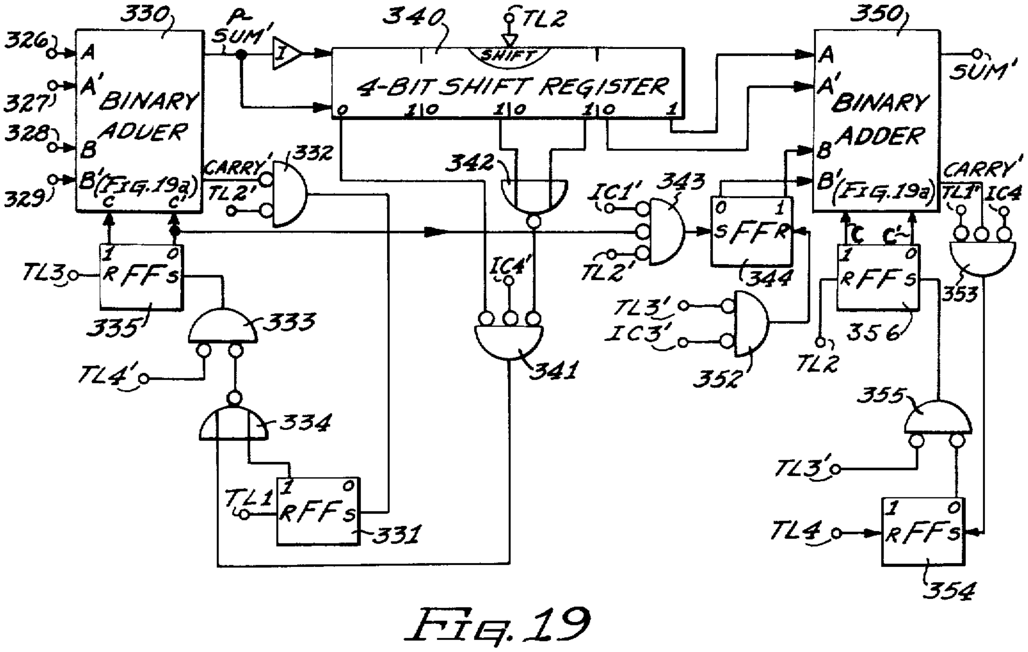
FIG. 19 is a schematic diagram of the binary-coded decimal adder in the accumulator section of FIG. 18

In the binary-coded decimal adder illustrated in FIG. 19, the addend serially presented at terminals 326 and 327 is serially added to the augend serially presented at terminals 328 and 329. The complement of the final sum is then serially presented at an output terminal indicated by the legend SUM'. The manner in which the novel adder is implemented will now be described. It includes a first conventional full adder 330 to develop the sum of the addend and the augend, bit-by-bit, and to develop a carry signal whenever any two of the three input signals A, B and C are equal to a bit 1. A complement of the carry signal is gated by a TL2' to a buffer flip-flop 331 through an AND-gate 332. The false output signal of the flip-flop 331 is transmitted to an AND-gate 333 through an OR-gate 334 until a TL1 pulse resets the flip-flop 331. A TL4' pulse gates the carry complement to a carry flip-flop 335 which then generates both a carry signal C and its complement C' until a TL3 pulse resets it.

The sum developed by the binary adder 330 is serially shifted into a four-bit shift register 340. Four successive TL2 pulses are therefore fed to its shift input terminal in order to shift the four-bit binary-coded sum into the shift register.

As noted hereinbefore, the sum from the binary adder 330 may exceed nine. Consequently, it is necessary to detect when a digit of the sum is any of the forbidden words from ten to fifteen. A clocked AND-gate 341 is provided for that purpose. An IC4' clock pulse is required at one of its input terminals to insure that an output signal is not transmitted except when the four-bit word to be checked has been properly stored in the shift register.

If a forbidden word is present in the four-bit shift register during an IC4 interval, a TL4' pulse gates a signal through the AND-gate 333 to set the carry flip-flop 335, thereby inserting a bit 1 carry to be added to the next four-bit binary-coded decimal digit of the augend. The decoding logic to determine when there is a forbidden word stored in the shift register 340 consists of a connection from the false side of the first stage to the AND-gate 341 and connections from the true sides of the second and third stages to a third input terminal of the AND-gate 341 through an OR-gate 342.

In that manner, a detected forbidden word is partially corrected because a bit 1 carry has been inserted in the digit of the next higher decimal order. To complete the correction, a six must be added to the detected forbidden word. This is accomplished by gating the complement of the carry signal from the flip-flop 335 through an AND-gate 343 with a TL2' pulse during the next IC1' interval to set a flip-flop 344. It should be noted that whereas all carries propagated by the first binary adder 330 set the carry flip-flop 335, it is only when the carry flip-flop 335 is set during an IC4 period that a carry signal C' is gated to the flip-flop 344 to add a six to the forbidden word.

By the time the flip-flop 344 is set, the first bit of the forbidden word will have been transmitted through a second binary adder 350 without alteration. In effect then, a bit 0 is added to the first bit fed to the binary adder 350 from the shift register 340. By the time the second bit of the forbidden word is fed to the binary adder, the flip-flop 344 is set and a bit 1 is added to that second bit. The flip-flop 344 is not reset until a TL3′ pulse gates an IC3′ signal through an AND-gate 352. Therefore, a bit 1 is added to the third bit of the forbidden word fed to the binary adder. The fourth bit of the forbidden word is then fed to the binary adder after the flip-flop 344 is reset. Accordingly, the fourth bit is translated through the adder without alteration unless a carry signal was propagated by the binary adder 350 as a result of a bit being added to the third bit of the forbidden word. In that manner a binary-coded six (0110) is added to the forbidden word in order to subtract ten and thereby correct the sum as explained hereinbefore.

Each carry propagated by the second binary adder 350 is gated through an AND-gate 353 by a TL1′ pulse except during the IC4 count interval. During that interval, a 0 volt signal is present at a third input terminal of the AND-gate 353 which inhibits it from transmitting the carry signal being propagated from the most significant bit order of one digit to the least significant bit order of the next digit when a six is added to correct a forbidden word detected in the shift register.

Each carry signal gated by a TL1′ pulse through the AND-gate 353 sets a buffer flip-flop 354. A TL3′ pulse then gates the buffer output through an AND-gate 355 to set a carry flip-flop 356. Afterwards, a TL4 pulse resets the buffer flip-flop 354 and the following TL2 pulse resets the carry flip-flop 356 to clear the carry signal.

If the sum of two digits is sixteen, seventeen or eighteen, only part of the forbidden sum is stored in the shift register, the other part being a carry propagated during an IC4 interval when the most significant bits of the addend and augend are added in the first binary adder 330. The part that is stored in the shaft register will be equal to either zero, one or two depending upon whether the sum is sixteen, seventeen or eighteen. None of those parts appear as forbidden words; instead, they appear as proper digits. Therefore, the decoding AND-gate 341 will not initiate the addition of six necessary to correct the second part of the sum stored in the shift register. However, the forbidden sum will nevertheless be automatically corrected because the carry propagated by the addition of the most significant bits in the first binary adder 330 is gated from the carry flip-flop 335 through the AND-gate 343 by a TL2′ pulse during the next IC1′ interval to initiate the addition of six in the second binary adder 350. Correction of each of the forbidden sums sixteen, seventeen and eighteen is then accomplished by the addition of six to the part stored in the shift register in order to obtain the sum of six, seven and eight, respectively. The other part of the correcting process, namely the propagation of a carry to the next higher decimal order is accomplished by adding the carry signal output of the flip-flop 355 to the first bit of the digit in the next higher order.

*Binary Adder*

Figure 19A:
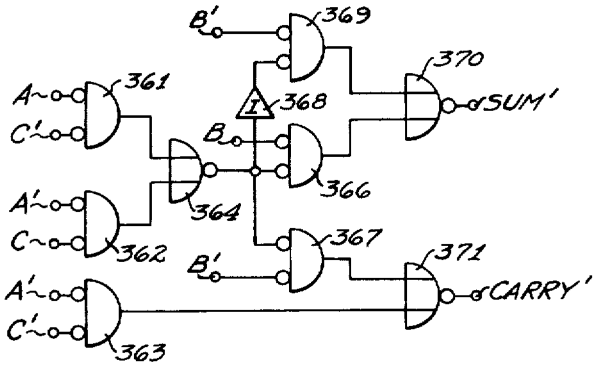
FIG. 19*a* is a schematic diagram of a full binary adder utilized in the binary-coded decimal adder.

A schematic diagram for the binary adders 330 and 350 is illustrated in FIG. 19*a*. It is a particular configuration which employs the logic element of FIG. 7 to implement the logic necessary to serially add a binary-coded addend A to a binary-coded augend B according to the well known binary addition rules of operation of a full adder as shown in the following table where A and B are addend and augend bits, respectively, of a given order of two binary numbers to be serially added together, and C is the carry from the addition of bits in the next lower order.

RULES FOR BINARY ADDITION

| | | | | | | | | |
|---|---|---|---|---|---|---|---|---|
| A | 0 | 1 | 0 | 0 | 1 | 1 | 0 | 1 |
| B | 0 | 0 | 1 | 0 | 1 | 0 | 1 | 1 |
| C | 0 | 0 | 0 | 1 | 0 | 1 | 1 | 1 |
| SUM | 0 | 1 | 1 | 1 | 0 | 0 | 0 | 1 |
| CARRY | 0 | 0 | 0 | 0 | 1 | 1 | 1 | 1 |

The instant configuration implements the logic necessary to combine three bits A, B and C and obtain a SUM′ and CARRY′ signal in accordance with the rules in the foregoing table. The addend A and its complement A′ are first combined with the carry C and its complement C′ by three AND-gates 361, 362 and 363. If either A or C, but not both, is a bit 1, the complement of the bit 1 signal is transmited by an OR-gate 364. If both A and C are a bit 1, CARRY signal is transmited by the AND-gate 363.

The output of the OR-gate 364 is then combined with the augend B and its complement B′ by two AND-gates 366 and 367. The complement of the output of the OR-gate 364 derived from an inverter 368 is also combined with the complement of the augend B′ by an AND-gate 369. The output terminals of the AND-gates 366 and 369 are coupled to a SUM′ output terminal by and OR-gate 370. The AND-gates 369 and 366, together with the OR-gate 370, constitute an "exclusive-or" circuit just as the AND-gates 361 and 362, together with the OR-gate 364, constitute an "exclusive-or" circuit. The function of such an "exclusive-or" circuit is (1) to add a bit 1 to a bit 1 and obtain a bit 0 as the sum and (2) to add a bit 1 to a bit 0 and obtain as the sum a bit 1. Thus, the output signal of such a circuit is a bit 1 if either input signal, but not both, is a bit 1 and a bit 0 if both of the input signals are a bit 1. Accordingly, the first "exclusive-or" circuit adds A and C to obtain an intermediate sum. The second "exclusive-or" circuit then combines the intermediate sum with the augend B to obtain the sum. However, because of the inherent inverting function of the logic AND and OR-gates, the output signal is actually the complement of the sum, as indicated by the legend SUM′ at the output terminal of the OR-gate 370.

The ouput signals of the AND-gates 363 and 367 are coupled to a carry output terminal by an OR-gate 371 to provide the complement of a bit 1 carry if (1) both A and C are a bit 1 or (2) if either A or C, but not both, and B are a bit 1. Of course, the complement of each of the signals A, B and C is used to obtain the complement of the bit 1 signal, as indicated by the legend CARRY′ at the output terminal of the OR-gate 371, because of the inherent inverting function of the logic AND and OR-gates employed.

BUFFER SECTION

As noted hereinbefore with reference to FIG. 1, data is accumulated in the accumulator section until a shear command is received. During a following complete half drum cycle, all of the data is transferred to a drum buffer 14 where it is stored until it is needed by the printer 16 for the preparation of a permanent record.

*Drum Buffer*

The manner in which the drum buffer is implemented is illustrated in FIG. 18. It consists of a plurality of sectors arranged in pairs around the drum 18 on a track 370 in the same manner as the accumulator sectors on the track 302. When the transfer flip-flop 319 in the transfer switch 13 is set by the coincidence of a shear signal and an IL3′ pulse at the AND-gate 324, the AND-gate 316 is disabled. The AND-gate 325 then enabled transmits the data from the adder 311 to the buffer track 370 during the next half cycle, after which the flip-flop 319 is reset by an IL1 pulse and the accumulation of new data from the next coil inspected begins in the accumulating section.

Each bit of data from the AND-gate 325 is gated by a TL1′ pulse through an AND-gate 371 to a write amplifier 372 and its associated head 373. Since the transferring of data will always start at the beginning of a half drum cycle, the transferring operation is completed in one half of a drum cycle. During the next half drum cycle, the transferred data recorded on one half of the buffer track 370 is read by a head 374 and amplifier 375. Each bit of data read is stored in a buffer flip-flop 376 from a time prior to a TL1′ pulse until a TL2 pulse resets it. The complement of each bit stored in the buffer flip-flop is transmitted through an AND-gate 377 which is connected to an output terminal 378 of the flip-flop 376 and enabled by the true side of the flip-flop 319 which has been reset by an IL1 pulse at the beginning of the next cycle. The output signals from the AND-gate 377 are transmitted through an OR-gate 379 to the AND-gate 371 and gated by TL1′ pulses to the write amplifier 372.

It should be noted that data read from one sector of the accumulator track 312 and recorded on the other sector does not precess around the drum because the head 318 has been slipped forward four bit positions relative to the reading head 313, thereby compensating for the delay through the adder 311. However, it is important to also note that in transferring data from the accumulator track 312 to the buffer track 370 the data will precess through four bit positions or binary cells because of the four-bit delay through the adder. Slipping the head 373 forward in the direction of drum rotation by the same amount that the head 318 is slipped will not compensate for the delay through the adder 311. This has been emphasized in the drawing by illustrating the head 373 as having been placed adjacent the head 318. Therefore, the data stored is shifted four cells to the right relative to the T-MARK pulses. Thereafter, the T-MARK pulses will occur during the first cell period of a preceding four-bit digit. For instance, the T2 pulse will occur when the first bit of the fourth digit of the first accumulator is being scanned. By placing the head 374 opposite the head 373, as illustrated, further precessing of the data with respect to the index and T-MARK pulses in the drum buffer will not occur as the data is continually transferred from one side or half of the track to the other.

*Data Print Control*

Figure 20:
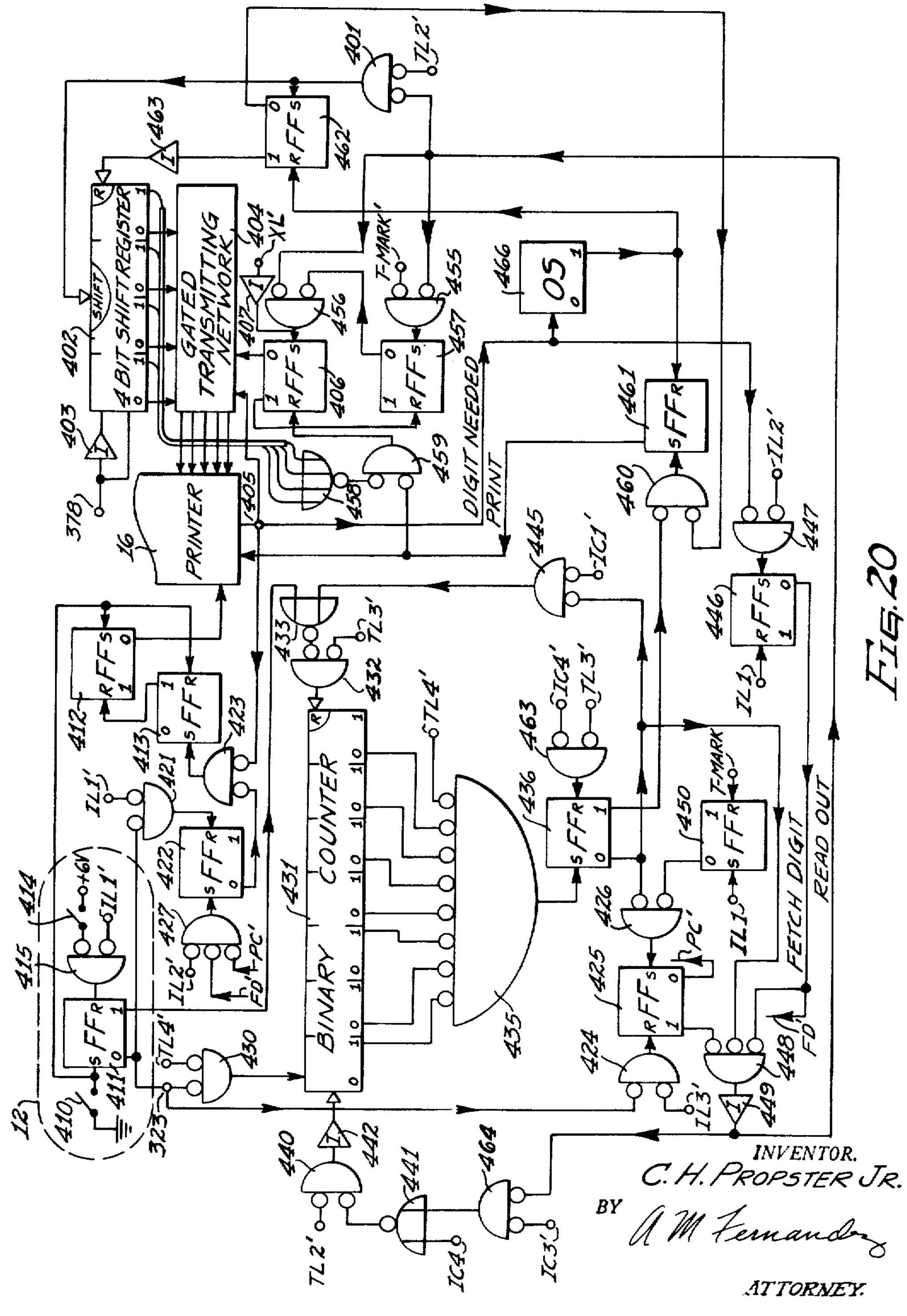
FIG. 20 is a schematic diagram of the print control section of FIG. 1.

The function of the data print control circuit illustrated in FIG. 20, is to present the data in the drum buffer (FIG. 18) to the printer in serial fashion. In order to identify particular digits, reference will be made to certain accumulators even though the data to be printed has been transferred to the drum buffer. Thus, a particular digit will be identified by the accumulator from which it has been transferred.

In printing data from the drum, the most significant digit of the sixth accumulator is printed first followed by the less significant digits, in order, until all four digits have been printed. This process is then repeated for the fifth, fourth, third, second and first accumulator, in order. All of the data is printed on a sheet of paper from left to right on a single line so that the most significant digit of each accumulator will appear on the left. The data may be identified by its relative position in the line. Vertical lines may be provided on the sheet at intervals of four spaces to separate the data. When the least significant digit of the first accumulator has been printed, the printer, which may be both manually and electronically operated, is turned off and the print control circuit is reset to its initial condition.

The presentation of data to the printer 16 is controlled by an AND-gate 401 which, when enabled, transmits TL2′ pulses to the shift input terminal of a four-bit shift register 402, the serial input terminals of which are connected to the output terminal 378 of the buffer flip-flop 376 in the drum buffer (FIG. 18). The signal at the terminal 378 is the complement or false output signal of a given bit stored in the buffer flip-flop 376. Accordingly, the terminal 378 is connected directly to the false input terminal of the shift register and is coupled by an inverter 403 to the true input terminal of the shift register. The function of the shift register is to convert each four-bit digit to be printed from time sequential information to static parallel information. The AND-gate 401 transmits four successive TL2′ pulses to the shift register each time a digit to be printed is read from the buffer into the shift register.

Each static four-bit digit is transmitted in parallel from the shift register to the printer by a network 404 which may include a code converter if one is necessary in order to operate the printer. In the present embodiment, it is assumed that the printer is electronically operated with the 8, 4, 2, 1 code employed throughout for the binary-coded decimal digits. Therefore, the network 404 transmits each bit of a given digit to the printer through separate parallel channels, each channel including a two-input AND-gate of the type described with reference to FIGS. 7 and 7*a*. One input terminal of each AND-gates is connected to an output terminal 405 of the printer. A cam-actuated switch delivers a +6 volt digit-needed signal to the terminal 405 when the printer has completed printing a digit and is in its position of rest. Accordingly, when the digit-needed signal is present, the gated transmitting network 404 translates the signals from the false output terminals of the shift register to the printer.

The network 404 provides a fifth channel which also includes a two-input AND-gate having one input terminal connected to the false output terminal of a zero-suppress flip-flop 406 and the other input terminal connected to the terminal 405. The function of that flip-flop is to provide a fifth bit to be translated to the printer when a digit-needed signal is present. That bit is normally a bit 0 which may always be ignored while printing any digit. However, if the flip-flop 406 has been set to insert a bit 1 and the digit to be printed is the binary code 0000 for the digit zero, the bit 1 inserted provides the binary-coded word 00001, which is the coded instruction to be used for causing the printer to advance one space without printing the digit zero, thereby suppressing a zero. In the present embodiment, all zeroes which occur before the first non-zero digit of the data to be printed from a given accumulator are to be suppressed.

Signals from the shear and print command source initiate the process of printing the accumulated data. For simplicity, the shear command source is illustrated as a switch 410 which is momentarily closed to set a flip-flop 411 and thereby transmit a +6 volt shear signal to the output terminal 323. That signal actuates the transfer switch 13 (FIG. 18) to cause the accumulated data to be transferred to the drum buffer as described hereinbefore and to initially set the zero-suppress flip-flop 406 by a +6 volt XL′ signal transmitted from the false side of the flip-flop 319 (FIG. 18) and inverted to a 0 volt signal by an inverter 407.

The process of transferring data to the drum buffer requires at most one drum revolution cycle which has been assumed to be about 33⅓ milliseconds in the present embodiment. Accordingly, the automatic printing of data from the buffer drum may begin almost immediately. However, provision is made for first manually printing such information as the coil number and the customer's order number.

Momentarily closing the switch 410 also sets a flip-flop 412 and resets a flip-flop 413. The function of the flip-flop 412 is to turn the printer on while it is set. Data may then be manually printed. The function of the flip-flop 413 is to reset the flip-flop 412 when the automatic printing of the drum data is complete in order to turn the printer off.

When the manual printing has been completed, a switch 414 is momentarily closed to enable an AND-gate 415.

The next IL1′ pulse is then transmitted through the enabled AND-gate to reset the flip-flop 411 and initiate the automatic printing of the drum data.

Before the flip-flop 411 is reset, however, the shear signal gates an IL1′ pulse through an AND-gate 421 to reset a flip-flop 422 previously set upon the completion of the automatic printing of drum data pertaining to the last coil sheared from the line. The function of that flip-flop is to enable an AND-gate 423 when it is set after the last digit to be printed has been read out of the drum buffer into the shift register 402. When the printing of the last digit has been completed, the cam-actuated switch produces a digit-needed signal and the AND-gate transmits a signal to set the flip-flop 413 which in turn resets the flip-flop 412 and turns the printer off.

The shear signal also enables an AND-gate 424 which transmits an IL3′ pulse to a flip-flop 425 which had been set upon the completion of the last printing cycle by a signal transmitted through an AND-gate 426. The function of the AND-gate 426 is to detect when the last digit to be printed has been read into the shift register 402. That digit is the first or least significant digit of the first accumulator. When the flip-flop 425 is set, a print-complete signal PC′ is transmitted to one of three input terminals of an AND-gate 427 via a lead not shown. The function of that AND-gate is to transmit an IL2′ pulse to the set input terminal of the flip-flop 422. However, a fetch-digit control signal FD′ is required at the third input terminal of that AND-gate before an IL2′ pulse may be transmitted to set the flip-flop 422 and initiate the steps necessary to turn the printer off. The manner in which the fetch-digit signal is produced will be described as the description of a printing cycle progresses.

A third AND-gate 430 is also enabled by the shear signal presented at terminal 323. It transmits TL4′ pulses to the set input terminal of the first stage of a binary counter 431, thereby advancing the count to one. TL3′ pulses are transmitted through an AND-gate 432 which is also enabled through an OR-gate 433 by the true output signal of the flip-flop 411, thereby resetting the counter 431 to zero. Accordingly, as long as the flip-flop 411 is set, the first stage is continually set and reset.

The next IL1′ pulse to occur after the switch 414 is closed resets the flip-flop 411 and disables the AND-gates 421, 424, 430 and 432. The flip-flops 422 and 425 remain reset and the first stage of the binary counter 431 remains set since the last TL4′ pulse in a given half drum cycle sets it, and the next resetting TL3′ pulse is not transmitted to the AND-gate 432 until after the IL1′ pulse has reset the flip-flop 411 and disabled the AND-gate 432. In that manner, an extra bit 1 is initially inserted in the binary counter 431 when the automatic printing process is begun by the coincidence of an IL1′ pulse and the closure of the switch 414. That bit is denominated an extra bit because the counter is normally advanced by TL2′ pulses which occur during IC4′ intervals in order to locate a given digit to be counted. The function of that extra bit is to permit the counter to address the digit stored in the 122nd sector by reaching a count of 122 while the 121st digit sector is being scanned.

The function of the counter 431 itself will now be more fully described. It is to be assumed that there are 122 digit sectors on each half of the buffer track, each capable of storing a four-bit binary-coded digit, and that digits are actually stored in only the last twenty-four sectors. The counter will locate the first digit to be read out of the 122nd sector by counting to 122. Since an extra bit was inserted initially, the counter will reach the count of 122 when the 121st sector is being scanned. An AND-gate 435 is then enabled by output signals from the counter. A subsequent TL4′ pulse is transmitted through the enabled AND-gate to the flip-flop 436 thereby setting it to initiate the generation of a read-out control signal if the cam-actuated switch in the printer is transmitting a digit-needed signal. If it is, the digit in the 122nd sector is read into the shift register 402 and printed in a manner to be more fully described. If it is not, the digit in the 122nd sector is not read into the shift register and printer. In either event, the counter is reset to zero when the first cell of the 122nd sector is scanned.

If the digit in the 122nd sector is not printed, the counter will begin counting again as that sector is being scanned. Accordingly, the count of 122 will be reached again while the 121st sector on the other side of the buffer track is being scanned. In that manner, the 122nd sector will continually be addressed until it is read out and printed.

After the digit in the 122nd sector is printed, the counter must address the 121st sector by again reaching the count of 122. To accomplish that, another extra bit is inserted while the 122nd sector is being scanned. Thereafter, as the normal counting procedure is resumed while the 122nd sector is still being scanned, the counter will be advanced until it reaches the count of 122 during the 120th sector. If a digit-needed signal is then present, the 121st digit is read out, a third extra bit is inserted and the counter is subsequently advanced to 122 while the 119th sector is being scanned in order to read out third digit stored in the 120th sector.

In that manner, each digit stored is addressed in sequence, at a rate determined by the printer, by always counting 121 sectors relative to the last one read out and printed. The precessing of the address is continued by inserting an extra bit 1 each time a digit is printed until all of the twenty-four digits stored have been printed. When the last digit stored has been printed, the address will again be precessed to the next digit sector, but since a digit is not stored in that sector, the completion of the automatic printing process is detected and the printer is turned off.

The manner in which the foregoing function is accomplished will now be described. The counter 431 is driven by TL2′ pulses transmitted through an AND-gate 440 when enabling IC4 pulses are transmitted to a second input terminal of the AND-gate through an OR-gate 441. An inverter 442 couples the AND-gate 440 to the input terminal of the counter 431 in order to provide positive-going pulses to the steering circuit of the first binary stage of the counter.

Since the first stage of the counter was set by a TL4′ pulse, the first TL2′ pulse gated by the first IC4 signal advances the count to two. Referring briefly to FIG. 2, the following may be readily understood: (1) that the first TL2′ pulse gated to the counter is the fifth TL2′ pulse in the half drum cycle following the IL1 pulse which resets the flip-flop 411 to begin the automatic printing process; (2) that the second, third, fourth and fifth TL1′ pulses mark the cells of the first four-bit digit memory sector on the buffer track; and (3) that the first TL2′ pulse gated to the counter occurs at the end of the first digit sector. Accordingly, the counter is advanced to two approximately twenty-five microseconds before the first bit of the second digit sector is scanned. Each TL2′ pulse gated by subsequent IC4 signals advances the counter until the count of 122 is reached twenty-five microseconds before the first cell of the 122nd digit sector is scanned.

When the count of 122 is reached, the AND-gate 435 is enabled. Ten microseconds later, a TL4′ pulse is transmitted through the enabled AND-gate 435 to set the flip-flop 436, thereby enabling an AND-gate 445. An IC1′ pulse is then transmitted to the AND-gate 432 via the OR-gate 433 to gate the next TL3′ pulse to the reset input terminal of the counter 431. In that manner, the counter is reset while the first binary cell of the 122nd digit is being scanned.

If the printer had not been free to print a digit at the beginning of the half drum cycle during which the 122nd digit was located, a digit-needed signal would not have been transmitted from the terminal 405. Therefore, an IL2′ pulse would not have been gated to a flip-flop 446 through an AND-gate 447 and the flip-flop 446 would not have been set to produce a fetch-digit control signal. Accordingly, an AND-gate 448 would not have been enabled and a read-out control signal would not have been transmitted through an inverter 449 to the read-out control AND-gate 401 in order to gate four TL2' pulses while the four binary cells of the 122nd sector are being scanned.

Under those conditions, the 122nd digit is not read into the shift register 402 and the binary counter, after first being reset by a TL3' pulse, continues to count all subsequent TL2' pulses which occur during IC4 intervals. Upon again reaching the count of 122, the counter again locates the 122nd digit in the same manner as before. If the fetch-digit signal is then present, the four-bits of the 122nd digit are read from the other half of the drum. Assuming that a fetch-digit control signal is present when the flip-flop 436 is set, the AND-gate 448 transmits a read-out control signal to the AND-gate 401.

It should be noted that the flip-flop 425 remains reset because the only way in which it can be set is by having both flip-flops 436 and 450 set at the same time. That can not occur until after the least significant digit of the first accumulator in the 99th digit sector has been printed. At that time the address will precess to the 98th digit address and the count of 122 will be reached when the last cell of the 97th digit is being scanned. A TL4' pulse transmitted during that period sets the flip-flop 436. By then, the flip-flop 450 has been set by an IL1 pulse but not reset because the first T-MARK pulse T1 does not occur for at least five microseconds. Accordingly, the AND-gate 426 transmits a signal to the flip-flop 425 and resets it, thereby disabling the AND-gate 448. However, while locating the 122nd digit sector, the print-complete circuit does not function because the flip-flop 450 is reset and the flip-flop 425 is not set. Accordingly, a read-out control signal is transmitted to the AND-gate 401 to enable it to transmit four successive TL2' pulses which shift the four-bit digit from the 122nd sector into the shift register 402.

The zero-suppress flip-flop 406, initially set by an XL pulse, is reset by the first non-zero digit of the sixth accumulator in a manner to be described. It is set again by the first digit to be printed from each subsequent accumulator. For instance, assume that the 118th digit sector is addressed. The read-out control signal enables an AND-gate 455 and an AND-gate 456. The T-MARK' pulse T9 which now occurs four cell periods earlier with respect to the stored data, is transmitted through the enabled AND-gate 455 and the flip-flop 457 is set. Its false output signal transmitted through the enabled AND-gate 456 sets the zero-suppress flip-flop 406, the true output signal of which resets the flip-flop 457.

The true output signals from each stage of the shift register are connected to input terminals of an OR-gate 458. If each bit of the four-bit digit stored in the shift register is a bit 0, all of the signals to the OR-gate are +6 volt signals. Accordingly, its output terminal remains at 0 volts and an AND-gate 459 remains disabled.

A signal transmitted by an AND-gate 460 sets a flip-flop 461 which transmits a print signal to the printer and the AND-gate 459. However, because the AND-gate is not enabled, a signal is not transmitted to reset the flip-flop 406. Accordingly, the flip-flop 406 inserts a bit 1 into the network 404 and a space or blank is provided on the record instead of a zero.

The AND-gate 460 does not transmit a signal to the print control flip-flop 461 until after a flip-flop 462 is set and the flip-flop 436 is reset. The former is set by the first TL2' pulse gated through the AND-gate 401. The latter is reset by a TL3' pulse transmitted through an AND-gate 463 during the IC4' interval, which is during the next timing level period following the TL2' pulse which shifts the fourth bit of the digit to be printed into the shift register.

In the interim, the false output signal from the set flip-flop 436 enables the AND-gate 445 to transmit an IC1' pulse via the OR-gate 433 to the AND-gate 432. A TL3' pulse is thereby gated to the reset input terminal of the counter 431 and the counter is reset.

When the flip-flop 436 is reset the read-out control signal is removed, the AND-gate 401 is disabled and no further TL2' pulses are transmitted to the shift register. Thus, the flip-flop 436 is set to provide a read-out control signal if the fetch-digit signal is present from the time of a TL4' pulse of the IC4 interval preceding the sector of the digit to be printed out until the time TL3' pulse of the IC4' interval of the digit read out to be printed. Referring again to the fourth and fifth graphs of FIG. 2, it may readily seen that only four TL2' pulses occur while the flip-flop 436 is set.

Before the flip-flop 436 is reset, the read-out control signal gates an IC3' interval-count signal through an AND-gate 464. That signal is transmitted to the AND-gate 440 through the OR-gate 441 to gate a TL2' pulse to the binary counter 431, thereby inserting an extra bit which causes the counter to locate the next digit to be printed out. Subsequent TL2' pulses gated by IC4 signals via the OR-gate 441 advance the counter to 122. Due to the extra bit inserted while the 121st digit sector was being scanned and the TL2' pulse counted while the 122nd digit sector was being read out into the shift register, the counter reaches the count of 122 while the 120th digit sector on the other side of the buffer track is being scanned.

Even the fastest printer available would not complete the printing of the first digit by the time the second digit is located on the other side of the buffer track. Accordingly, the counter is reset several times by TL3' pulses during an IC1' interval of the 121st digit sector and again advanced to 122 by TL2' pulses. However, since a read-out signal is not being transmitted to the AND-gate 464 each time the count of 122 is reached, extra TL2' pulses are not inserted again. Accordingly, the counter continually addresses the 121st digit until a fetch-digit control signal is present.

When the printing of the first digit has been completed, a digit-needed signal is transmitted to a one-shot circuit 466 which in turn resets the print control flip-flop 461 and the flip-flop 462. The latter resets the shift register 402 through an inverter 463.

The digit-needed signal also enables the AND-gate 447 as described hereinbefore. The next IL2' pulse, therefore, sets the flip-flop 446 via the AND-gate 447. Accordingly, when the 121st digit is again located, a read-out control signal is transmitted to the AND-gate 401 and the 121st digit is read out.

If the 121st digit is not a zero, the AND-gate 459 is enabled and the print signal, generated in the same manner as before, resets the flip-flop 406. The non-zero digit is then printed. After the printing of that digit is complete, the cycle is repeated for the next two digits of the sixth accumulator, both of which are printed whether or not they are zeroes because the zero-suppress flip-flop 406 has been reset.

The drum data from each of the remaining accumulators is printed in a similar manner. For instance, when the most significant digit of the data from the fifth accumulator is located and read into the shift register 402, the T-MARK' pulse, the T9 pulse, which now occurs while the first cell of that digit is being scanned, sets the zero-suppress flip-flop 406. The first non-zero digit to be read into the shift register thereafter resets it and all subsequent digits from that accumulator are printed.

After the least significant digit of the first accumulator, the digit in the 99th digit sector has been located and read into the shift register 402, the counter will locate the 98th digit sector by setting the flip-flop 436 while the 97th digit is being addressed. The AND-gate 426 then transmits a signal for the first time because, as described hereinbefore, the flip-flop 450 set by the last IL1 pulse has not been reset by the T1 pulse. Accordingly, the flip-flop 425 transmits a print complete signal PC′ to the AND-gate 427.

When the printing of the least significant digit of the first accumulator has been completed, a fetch-digit signal FD′ is produced. However, a read-out signal is not produced again because the AND-gate 448 is no longer enabled since the flip-flop 425 has been set.

The fetch-digit signal FD′ is transmitted to an input terminal of the AND-gate 427 by a lead not shown. With both the PC′ and FD′ signals present, the AND-gate 427 is enabled and the next IL2′ pulse is transmitted to the flip-flop 422. The AND-gate 423 is enabled by a digit-needed signal at the terminal 405. Accordingly, when the flip-flop 422 is set by an IL2′ pulse via the AND-gate 427, the flip-flop 413 is set, the flip-flop 412 is reset and the printer is turned off, thereby completing one full printing cycle for all of the data pertaining to a given coil.

While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. A system for accumulating inspection data as items are being conveyed along an inspection line comprising: means for conveying said items along said line; a plurality of inspecting means placed along said line for providing inspection data, a given inspecting means being displaced a predetermined number of linear units of measure from a point of reference at the end of said line; a plurality of accumulators, at least one for each inspecting means; a plurality of shift registers, each coupling a given inspecting means to an associated accumulator, a given shift register having a shift control means and a plurality of stages equal in number to the number of linear units of measure that its associated inspecting means is displaced from said point of reference; and a means for synchronizing the translation of inspection data through said shift registers with the conveyance of said items along said line, said synchronizing means including a shift pulse generator controlled by the means for conveying said items along said line to generate one shift pulse for each linear unit of measure that said given item is conveyed along said line and means for coupling shift pulses to the shift control means of each shift register.

2. A system for accumulating inspection data as defined in claim 1 wherein a given shift register includes a pair of sectors on a track of a rotating magnetic medium, each sector having a plurality of binary cells equal in number to the number of stages of said given shift register; means for sequentially sensing the data in each one of said binary cells in a given sector and, in response to one of said shift pulses, for altering each of the binary cells in the other sector of said pair to correspond with the binary signal stored in the cell immediately preceding the corresponding cell in said given sector; and means responsive to said one of said shift pulses for altering the first of said cells in said other sector to correspond with an inspection data signal from its associated inspecting means.

3. A data accumulating system adapted to accumulate inspection data as items are being conveyed along an inspection line at a variable speed, where defect sensing means, serving as data sources, are disposed along the inspection line, a given one being displaced a predetermined number of linear units of measure from a point of reference, comprising: a plurality of said data sources; a plurality of corresponding shift registers, each having an input channel and an output channel; means for translating data from said data sources to the input channels of said corresponding shift registers; means for generating shift control pulses at a rate determined by the rate at which data is derived from said sources; means for applying said shift control pulses to said shift registers to cause said data in said shift register to be advanced one stage for each shift control pulse, each of said shift registers having a number of stages proportional to the number of linear units of measure it is displaced from said point of reference, to cause data translated from its input channel to its output channel to be delayed a predetermined number of integral periods, the length of each period being determined by the rate at which said shift pulse generating means generates shift pulses; a plurality of corresponding data accumulators; and means for translating data from said shift register output channels to said corresponding data accumulators.

4. A data accumulating system as in claim 3, wherein a given shift register includes: a pair of sectors oppositely disposed on a track of a cyclical magnetic medium having a constant cycle, each sector having a plurality of binary cells equal in number to the number of periods of delay with which said given shift register translates data to its output channel; means for sequentially sensing the data in each one of said binary cells in a given sector and, in response to one of said shift pulses, for altering each of the binary cells in the opposite sector to correspond with the binary cell immediately preceding the corresponding cell in said given sector; and means for altering the first one of said binary cells in said opposite sector to correspond with a binary digit translated from a corresponding one of said data sources.

5. A data accumulating system as in claim 4, wherein each of said data accumulators includes: a pair of sectors oppositely disposed on a track of said rotating magnetic medium, each sector having a plurality of binary cells for storing binary-coded digits; means for sensing binary-coded digits stored in said cells of a given sector of a particular pair; a serial binary adder connected to said means for sensing said binary-coded digits stored in said cells and to said means for translating data from said output channels to said data accumulators; and means for storing the sum of said binary-coded digits sensed from a given sector and data from a corresponding shift register output channel in the other sector of said particular pair.

6. In a system for accumulating inspection data pertaining to a given item being inspected by a plurality of defect sensing means as the item is conveyed along an inspection line, each sensing means being placed along said line a distinct number of linear units of measure from a point of reference, the combination comprising: a sensing means placed a given number $n$ of linear units of measure from said reference point for producing signals in response to defects detected; a data accumulator; a shift register having a number $n$ of binary storage stages coupling said accumulator to said sensing means; a pulse generating means synchronized with the conveyance of items along said line for producing a pulse for each linear unit of measure that said item is conveyed; and means for coupling said pulse producing means to a shift control terminal of said shift register to cause data in said shift register to be shifted one stage whereby signals of defects detected are accumulated by said accumulator when said given item reaches said point of reference.

7. In a system for accumulating data from a plurality of sources translated through a plurality of shift register channels to a plurality of accumulators, the combination comprising: a rotating magnetic medium having a plurality of tracks; means for generating index and timing signals, said index signals dividing said tracks into a plurality of equal parts and said timing signals dividing said parts into a plurality of binary cells; means for generating a first type of marker signals, said marker signals dividing said parts of a first track into a plurality of sectors, one for each shift register channel; reading means for rendering data in each of said shift register sectors of a given part sequentially available for transfer once during every cycle of rotation of said magnetic medium; a switching means; a delay means for translating said data to said switching means; a shift register having as many stages as there are shift register channels, a serial input terminal coupled to said reading means and a serial output terminal coupled to said switching means; a gating means responsive to said index signals for transmitting data in parallel to a plurality of input terminals connected to said shift register stages; writing means connected to said switching means for recording data in a sector of another part of said track; means responsive to said shift register marker signals for causing said switching means to translate data from said shift register to said writing means and for causing data in said shift register to be advanced one stage, said switching means being responsive to a shift control signal to translate data from said delay means to said writing means when data is not being translated from said shift register to said writing mean; means for translating data directly from said reading means to said writing means when said switching means is not translating data to said writing means from said delay means in response to a shift control signal and is not translating data to said writing means from said shift register in response to a marker signal; means for generating a second type of marker signals for dividing a second track into a plurality of sectors, one sector for each accumulator; reading means for rendering stored data in each of said sectors of a given part sequentially available for transfer once during every cycle of rotation of said magnetic medium; a binary adder adapted to receive said stored data directly from said reading means and to receive data to be accumulated through an adder gating means from a serial output terminal of a second shift register having a plurality of parallel input terminals coupled to parallel input terminals of said first shift register by a gating means for transmitting data in response to an index signal; means for translating said second type of marker signals to said adder gating means and to a shift-control terminal of said second shift register, said translating means being adapted to enable said adder gating means to transmit data to said adder and to advance data in said second shift register in response to said second type of marker signals; and writing means connected to an output terminal of said adder for recording a sum in a sector of another part of said second track.

8. A data accumulating system adapted to accumulate inspection data as items are being conveyed along an inspection line at a variable speed, where defect sensing means are disposed along the line, a given one being displaced a predetermined number of linear units of measure from a point of reference comprising: a plurality of accumulators, a given one serving as an accumulator for data from a given one of said defect sensing means; a plurality of shift registers, a given one coupling a given defect sensing means to its associated accumulator, each shift register having a predetermined number of stages for introducing a predetermined number of delay periods proportional to the number of linear units of measure that its associated defect sensing means is displaced from said point of reference, such that data derived from the defect sensing means at different times are accumulated by the plurality of accumulators during the same period; and means coupled to said shift registers and accumulators for synchronizing the translation of data through said shift registers and the accumulation of data by said accumulators with the conveyance of items being inspected along an inspection line at a variable speed, said synchronizing means comprises a generator of electrical pulses synchronized with the conveyance of items along the inspection line to produce a pulse for each linear unit of measure that a given item is conveyed and means for applying said pulses as shift and accumulation control signals to said shift registers and accumulators, respectively, whereby the length of a delay period at any given time is determined by the speed at which items are being conveyed along the inspection line.

9. A data accumulating system adapted to accumulate inspection data as items are being conveyed along an inspection line, where defect sensing means are disposed along the line, a given one being displaced a predetermined number of linear units of measure from a point of reference comprising: a plurality of accumulators, a given one serving as an accumulator for data from a given one of said defect sensing means; a plurality of shift registers, a given one coupling a given defect sensing means to its associated accumulator, each shift register having a predetermined number of stages for introducing a predetermined number of delay periods proportional to the number of linear units of measure that its associated defect sensing means is displaced from said point of reference, such that data derived from the defect sensing means at different times are accumulated by the plurality of accumulators during the same period; and an electrical pulse generating means synchronized with the conveyance of items being inspected along the line and arranged to produce a pulse for each linear unit of measure that a given item is conveyed, said pulse generating means being coupled to said shift registers and accumulators for applying pulses thereto for translating data through said shift register and accumulating data by said accumulators.

10. A data accumulating system adapted to accumulate inspection data as items are being conveyed along an inspection line at a variable speed, where defect sensing means are disposed along the line, a given one being displaced a predetermined number of linear units of measure from a point of reference comprising: a plurality of accumulators, a given one serving as an accumulator for data from a given one of said defect sensing means; a plurality of shift registers, a given one coupling a given defect sensing means to its associated accumulator, each shift register having a predetermined number of stages for introducing a predetermined number of delay periods proportional to the number of linear units of measure that its associated defect sensing means is displaced from said point of reference, such that data derived from the defect sensing means at different times are accumulated by the plurality of accumulators during the same period; and an electrical pulse generating means synchronized with the variable speed conveyance of items being inspected along the line and arranged to produce a pulse for each linear unit of measure that a given item is conveyed, said pulse generating means being coupled to said shift registers and accumulators for applying pulses thereto for translating data through said shift register and accumulating data by said accumulators.

References Cited in the file of this patent

UNITED STATES PATENTS

| | | |
|---|---|---|
| 2,591,008 | Rench | Apr. 1, 1952 |
| 2,672,284 | Dickinson | Mar. 16, 1954 |
| 2,770,797 | Hamilton | Nov. 13, 1956 |
| 2,776,618 | Hartley | Jan. 8, 1957 |
| 2,785,855 | Williams et al. | Mar. 19, 1957 |
| 2,793,345 | Hags | May 21, 1957 |
| 2,799,222 | Goldberg | July 16, 1957 |
| 2,823,855 | Nelson | Feb. 18, 1958 |
| 2,866,177 | Steele | Dec. 23, 1958 |
| 2,872,107 | Burkhart | Feb. 3, 1959 |
| 2,881,979 | Blundi | Apr. 14, 1959 |
| 2,904,252 | Bird | Sept. 15, 1959 |
| 3,003,003 | Einsel | Sept. 12, 1961 |
| 3,014,654 | Wilser et al. | Dec. 26, 1961 |